(12) United States Patent
Namgoong et al.

(10) Patent No.: US 12,237,947 B2
(45) Date of Patent: Feb. 25, 2025

(54) FEDERATED LEARNING FOR CLASSIFIERS AND AUTOENCODERS FOR WIRELESS COMMUNICATION

(71) Applicant: QUALCOMM Incorporated, San Diego, CA (US)

(72) Inventors: June Namgoong, San Diego, CA (US); Taesang Yoo, San Diego, CA (US); Naga Bhushan, San Diego, CA (US); Pavan Kumar Vitthaladevuni, San Diego, CA (US); Jay Kumar Sundararajan, San Diego, CA (US); Wanshi Chen, San Diego, CA (US); Krishna Kiran Mukkavilli, San Diego, CA (US); Hwan Joon Kwon, San Diego, CA (US); Alexandros Manolakos, Escondido, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 18/004,839

(22) PCT Filed: Aug. 17, 2021

(86) PCT No.: PCT/US2021/071209
§ 371 (c)(1),
(2) Date: Jan. 9, 2023

(87) PCT Pub. No.: WO2022/040678
PCT Pub. Date: Feb. 24, 2022

(65) Prior Publication Data
US 2023/0261909 A1 Aug. 17, 2023

(30) Foreign Application Priority Data

Aug. 18, 2020 (GR) ............................... 20200100499

(51) Int. Cl.
H04L 25/02 (2006.01)
G06N 3/0455 (2023.01)
H04L 25/03 (2006.01)

(52) U.S. Cl.
CPC ....... *H04L 25/0254* (2013.01); *G06N 3/0455* (2023.01); *H04L 25/03171* (2013.01)

(58) Field of Classification Search
CPC .......... H04L 25/0254; H04L 25/03171; G06N 3/0455
See application file for complete search history.

(56) References Cited

U.S. PATENT DOCUMENTS 10,922,788 B1 * 2/2021 Yu .......................... G06V 10/764
2018/0158078 A1 * 6/2018 Hsieh ..................... G06N 20/00
2020/0192927 A1 * 6/2020 Chawla .................. G06N 3/084

OTHER PUBLICATIONS

Boris C., et al., "Semi-Supervised Variational Autoencoder for WiFi Indoor Localization", 2019 International Conference on Indoor Positioning and Indoor Navigation (IPIN), IEEE, Sep. 30, 2019 (Sep. 30, 2019), pp. 1-8, XP033667309, DOI: 10.1109/IPIN.2019.8911825, Abstract, Sections IV, V, Figure 1.

(Continued)

*Primary Examiner* — Freshteh N Aghdam
(74) *Attorney, Agent, or Firm* — Harrity & Harrity, LLP

(57) ABSTRACT

Various aspects of the present disclosure generally relate to wireless communication. In some aspects, a client may select, based at least in part on a classifier, an autoencoder of a set of autoencoders to be used for encoding an observed wireless communication vector to generate a latent vector. The client may transmit the latent vector and an indication of the autoencoder. Numerous other aspects are provided.

30 Claims, 22 Drawing Sheets

(56) References Cited

OTHER PUBLICATIONS

Dong Y., et al., "CDC: Classification Driven Compression for Bandwidth Efficient Edge-Cloud Collaborative Deep Learning", arxiv.org, Cornell University Library, 201 Olin Library Cornell University Ithaca, NY 14853, May 4, 2020 (May 4, 2020), XP081659720, 7 Pages, Abstract, Section 3, figure 1.
Erpek T., et al: "Deep Learning for Wireless Communications", arxiv.org, Cornell University Library, 201 Olin Library Cornell University Ithaca, NY 14853, May 12, 2020 (May 12, 2020), XP081671638, The whole document.
International Search Report and Written Opinion—PCT/US2021/071209—ISA/EPO—Jan. 4, 2022.

* cited by examiner

FEDERATED LEARNING FOR CLASSIFIERS AND AUTOENCODERS FOR WIRELESS COMMUNICATION

CROSS-REFERENCE TO RELATED APPLICATIONS

This Patent Application is a 371 national stage of PCT Application No. PCT/US2021/071209 filed on Aug. 17, 2021, entitled "FEDERATED LEARNING FOR CLASSIFIERS AND AUTOENCODERS FOR WIRELESS COMMUNICATION," which claims priority to Greek patent application No. 20200100499, filed on Aug. 18, 2020, entitled "FEDERATED LEARNING FOR CLASSIFIERS AND AUTOENCODERS FOR WIRELESS COMMUNICATION," The disclosure of the prior Applications are considered part of and are hereby expressly incorporated by reference in this Patent Application.

CROSS-REFERENCE TO RELATED APPLICATION

This patent application claims priority to Greece Patent Application No. 20200100499, filed on Aug. 18, 2020, entitled "FEDERATED LEARNING FOR CLASSIFIERS AND AUTOENCODERS FOR WIRELESS COMMUNICATION," and assigned to the assignee hereof. The disclosure of the prior application is considered part of and is incorporated by reference into this patent application.

INTRODUCTION

Aspects of the present disclosure generally relate to wireless communication and to techniques and apparatuses for channel state information reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a client includes selecting, based at least in part on a classifier, an autoencoder of a set of autoencoders to be used for encoding an observed wireless communication vector to generate a latent vector. The method may include transmitting the latent vector and an indication of the autoencoder.

In some aspects, a method of wireless communication performed by a server includes receiving, from a client, an autoencoder identifier associated with an autoencoder of a set of autoencoders. The method may include receiving, from the client, a latent vector and selecting the autoencoder from the set of autoencoders based at least in part on the autoencoder identifier. The method may include determining an observed wireless communication vector based at least in part on the selected autoencoder and the latent vector. The method may include performing a wireless communication action based at least in part on determining the observed wireless communication vector.

In some aspects, a client for wireless communication includes a memory and one or more processors coupled to the memory. The memory and the one or more processors are configured to select, based at least in part on a classifier, an autoencoder of a set of autoencoders to be used for encoding an observed wireless communication vector to generate a latent vector. The memory and the one or more processors are configured to transmit the latent vector and an indication of the autoencoder.

In some aspects, a server for wireless communication includes a memory and one or more processors coupled to the memory. The memory and the one or more processors are configured to receive, from a client, an autoencoder identifier associated with an autoencoder of a set of autoencoders. The memory and the one or more processors are configured to receive, from the client, a latent vector. The memory and the one or more processors are configured to select the autoencoder from the set of autoencoders based at least in part on the autoencoder identifier. The memory and the one or more processors are configured to determine an observed wireless communication vector based at least in part on the selected autoencoder and the latent vector. The memory and the one or more processors are configured to perform a wireless communication action based at least in part on determining the observed wireless communication vector.

In some aspects, a non-transitory computer-readable medium storing a set of instructions for wireless communication includes one or more instructions that, when executed by one or more processors of a client, cause the client to select, based at least in part on a classifier, an autoencoder of a set of autoencoders to be used for encoding an observed wireless communication vector to generate a latent vector. The one or more instructions further cause the client to transmit the latent vector and an indication of the autoencoder.

In some aspects, a non-transitory computer-readable medium storing a set of instructions for wireless communication includes one or more instructions that, when executed by one or more processors of a server, cause the server to receive, from a client, an autoencoder identifier associated with an autoencoder of a set of autoencoders. The one or more instructions cause the server to receive, from the client, a latent vector and to select the autoencoder from the set of autoencoders based at least in part on the autoencoder identifier. The one or more instructions cause the server to determine an observed wireless communication vector based at least in part on the selected autoencoder and the latent vector. The one or more instructions cause the server to perform a wireless communication action based at least in part on determining the observed wireless communication vector.

In some aspects, an apparatus for wireless communication includes means for selecting, based at least in part on a classifier, an autoencoder of a set of autoencoders to be used for encoding an observed wireless communication vector to generate a latent vector. The apparatus also includes means for transmitting the latent vector and an indication of the autoencoder.

In some aspects, an apparatus for wireless communication includes means for receiving, from a client, an autoencoder identifier associated with an autoencoder of a set of autoencoders. The apparatus includes means for receiving, from the client, a latent vector and means for selecting the autoencoder from the set of autoencoders based at least in part on the autoencoder identifier. The apparatus includes means for determining an observed wireless communication vector based at least in part on the selected autoencoder and the latent vector. The apparatus includes means for performing a wireless communication action based at least in part on determining the observed wireless communication vector.

Aspects generally include a method, apparatus, system, computer program product, non-transitory computer-readable medium, client, user equipment, server, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
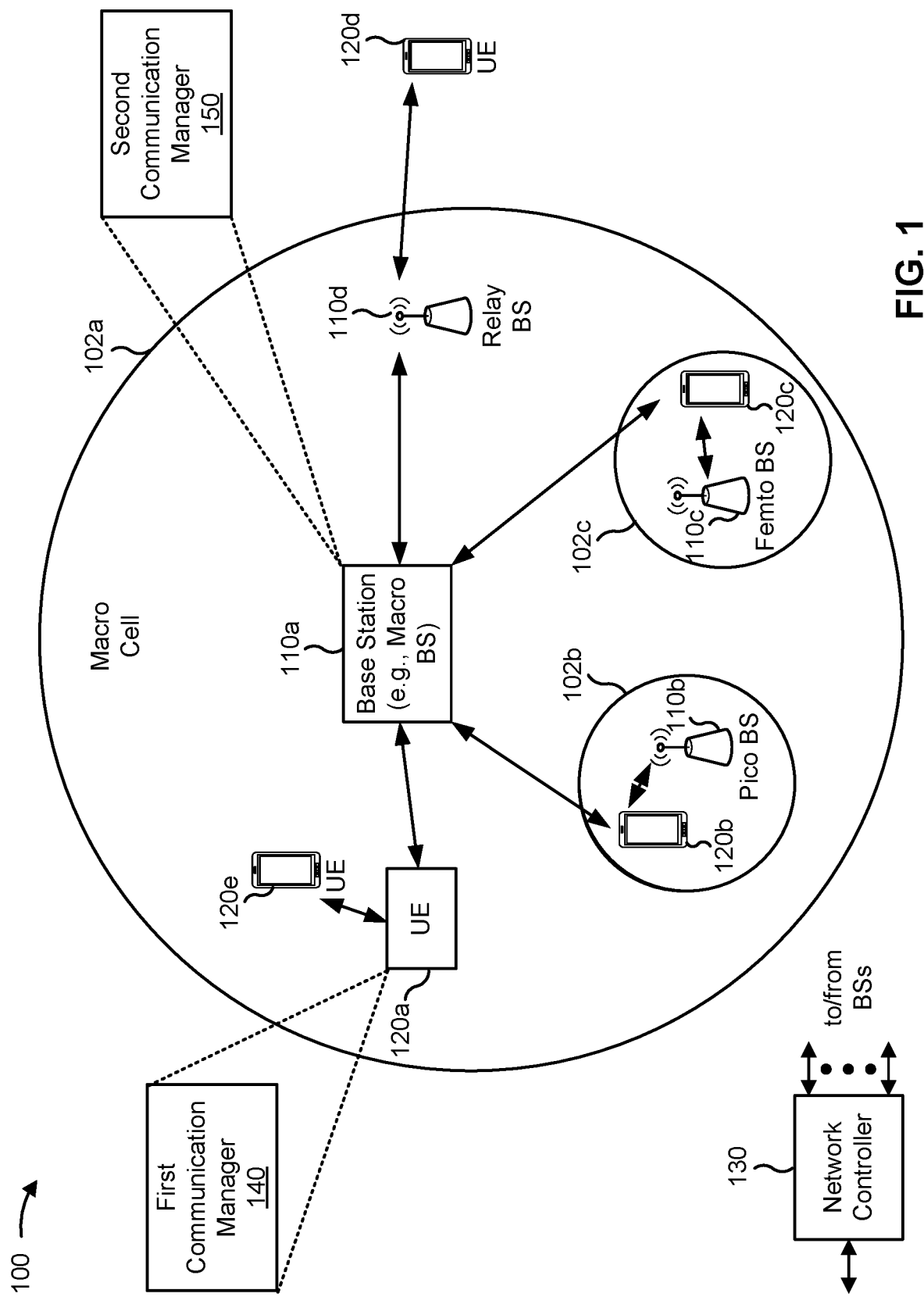
FIG. 1 is a diagram illustrating an example of a wireless network, in accordance with the present disclosure.

A client operating in a network may measure reference signals and/or the like to report to a server. For example, the client may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the server may consume communication and/or network resources.

In some aspects described herein, a client (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may use one or more neural networks that may be trained to learn dependence of measured qualities on individual parameters, isolate the measured qualities through various layers of the one or more neural networks (also referred to as "operations"), and compress measurements in a way that limits compression loss. The client may transmit the compressed measurements to the server (e.g., a TRP, another UE, a base station, and/or the like).

The server may decode the compressed measurements using one or more decompression operations and reconstruction operations associated with one or more neural networks. The one or more decompression and reconstruction operations may be based at least in part on a set of features of the compressed data set to produce reconstructed measurements. The server may perform a wireless communication action based at least in part on the reconstructed measurements.

In some aspects, the client and server may use a classifier and an associated set of autoencoders for compressing and reconstructing information. In some cases, a classifier and an associated set of autoencoders may be trained using federated learning. Federated learning is a machine learning technique that enables multiple clients to collaboratively learn neural network models, while the server does not collect the data from the clients. In a typical case, federated learning techniques involve a single global neural network model trained from the data stored on multiple clients. For example, in a Federated Averaging (FedAvg) algorithm, the server sends the neural network model to the clients. Each client trains the received neural network model using its own data and sends back an updated neural network model to the server. The server averages the updated neural network models from the clients to obtain a new neural network model.

However, in some cases, some clients may be operating in different environments than other clients (e.g. indoor/outdoor, stationary in a coffee shop/mobile on a highway, and/or the like). In some cases, different clients may be subject to different implementation aspects (e.g. different form factors, different RF impairments, and/or the like). As a result, it may be difficult to find a single neural network model that works well on all the devices in terms of physical layer link performance.

According to aspects of the techniques and apparatuses described herein, a client is configured with a classifier and a set of associated autoencoders. The autoencoders may be used to perform a wireless communication task (e.g., CSF computation, positioning, and/or the like). The classifier may be used to select an autoencoder to use for the wireless communication task based at least in part on an observed environmental vector associated with the environment of the client. In some aspects, the classifier is used to select the autoencoder by determining the probability of choosing each of the autoencoders of the set of encoders for the task in the perceived environment. During the training, the autoencoders and the classifier are collaboratively learned using the federated learning techniques. In this way, aspects may facilitate better physical layer link performance.

In some aspects, a set of autoencoders may be employed at the client and a classifier may be employed for selecting among the autoencoders. The classifier may be used to select the autoencoder that works well in the perceived environment. An observed environmental vector may be provided as input to the classifier, which may include a classification network configured to output a probability vector indicating probabilities of selecting respective autoencoders. The classifier may select the autoencoder associated with the highest probability.

An observed wireless communication vector may be provided to the selected autoencoder, which may be configured to perform a wireless communication task such as, for example, by providing a latent vector. The client may provide an indication of the autoencoder (e.g., an autoencoder identifier (ID)) and the latent vector to the server, which may use a decoder corresponding to the selected autoencoder to recover the observed wireless communication vector. Aspects of the techniques described herein may be used for any number of cross-node machine learning challenges including, for example, facilitating channel state feedback, facilitating positioning of the client, learning of modulation and/or waveforms for wireless communication, and/or the like.

In some aspects, one or more autoencoders may be employed at the client. In some aspects, one or more autoencoders may be employed at a server. An autoencoder employed at a client may be referred to herein as an "autoencoder" (when it is clear from context that the autoencoder is employed at a client as opposed to a server) or a "client autoencoder." An autoencoder employed at a server may be referred to as an "autoencoder" (when it is clear from context that the autoencoder is employed at a server as opposed to a client) or a "server autoencoder."

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may select, based at least in part on a classifier, an autoencoder of a set of autoencoders to be used for encoding an observed wireless communication vector to generate a latent vector; and transmit the latent vector and an indication of the autoencoder. Additionally, or alternatively, the first communication manager 140 may perform one or more other operations described herein.

In some aspects, the base station 110 may include a second communication manager 150. As described in more detail elsewhere herein, the second communication manager 150 may receive, from a client, an autoencoder identifier associated with an autoencoder of a set of autoencoders; receive, from the client, a latent vector; select the autoencoder from the set of autoencoders based at least in part on the autoencoder identifier; determine an observed wireless communication vector based at least in part on the selected autoencoder and the latent vector; and perform a wireless communication action based at least in part on determining the observed wireless communication vector. Additionally, or alternatively, the second communication manager 150 may perform one or more other operations described herein.

As indicated above, FIG. 1 is provided merely as an example. Other examples may differ from what is described with regard to FIG. 1.

Figure 2:
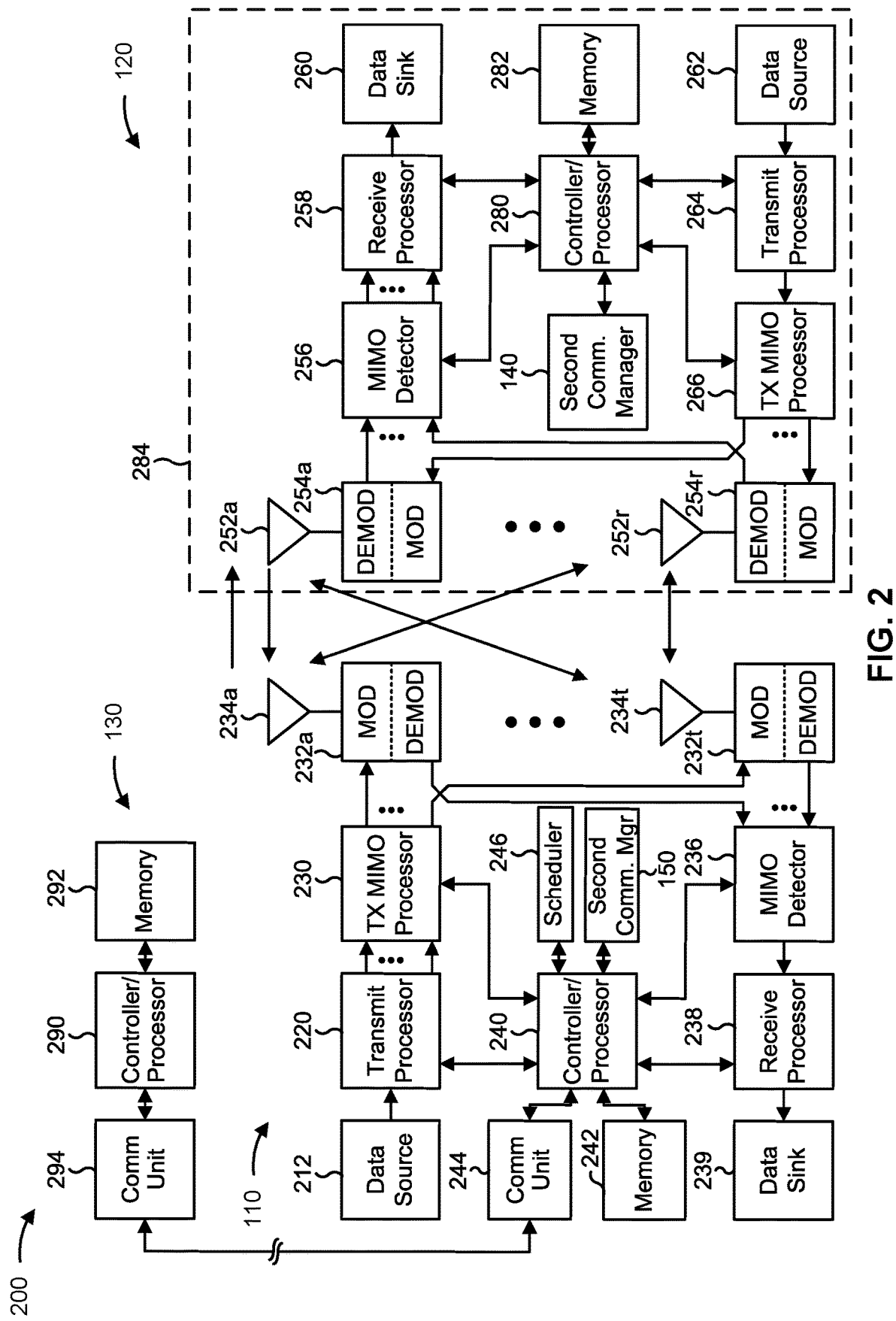
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with federated learning for classifiers and autoencoders for wireless communication, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, a client (e.g., the UE 120) may include means for selecting, based at least in part on a classifier, an autoencoder of a set of autoencoders to be used for encoding an observed wireless communication vector to generate a latent vector, means for transmitting the latent vector and an indication of the autoencoder, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a server (e.g., the base station 110) may include means for receiving, from a client, an autoencoder identifier associated with an autoencoder of a set of autoencoders, means for receiving, from the client, a latent vector, means for selecting the autoencoder from the set of autoencoders based at least in part on the autoencoder identifier, means for determining an observed wireless communication vector based at least in part on the selected autoencoder and the latent vector, means for performing a wireless communication action based at least in part on determining the observed wireless communication vector, and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

A client operating in a network may measure reference signals and/or the like to report to a server. For example, the client may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the server may consume communication and/or network resources.

In some aspects described herein, a client (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may use one or more neural networks that may be trained to learn dependence of measured qualities on individual parameters, isolate the measured qualities through various layers of the one or more neural networks (also referred to as "operations"), and compress measurements in a way that limits compression loss. The client may transmit the compressed measurements to a server (e.g., a TRP, another UE, a base station, and/or the like).

The server may decode the compressed measurements using one or more decompression operations and reconstruction operations associated with one or more neural networks. The one or more decompression and reconstruction operations may be based at least in part on a set of features of the compressed data set to produce reconstructed measurements. The server may perform a wireless communication action based at least in part on the reconstructed measurements.

In some aspects, the client and server may use a classifier and an associated set of autoencoders for compressing and reconstructing information. In some cases, a classifier and an associated set of autoencoders may be trained using federated learning. Federated learning is a machine learning technique that enables multiple clients to collaboratively learn neural network models, while the server does not collect the data from the user devices. In a typical case, federated learning techniques involve a single global neural network model trained from the data stored on multiple clients. For example, in a Federated Averaging (FedAvg) algorithm, the server sends the neural network model to the clients. Each client trains the received neural network model using its own data and sends back the updated neural network model to the server. The server averages the updated neural network models from the clients to obtain the new neural network model.

However, in some cases, some clients may be operating in different environments than other clients (e.g. indoor/outdoor, stationary in a coffee shop/mobile in a highway, and/or the like). In some cases, different clients may be subject to different implementation aspects (e.g. different form factors, different RF impairments, and/or the like). As a result, it may be difficult to find a single neural network model that works well on all the devices in terms of the physical layer link performance.

According to aspects of the techniques and apparatuses described herein, a client is configured with a classifier and a set of associated autoencoders. The autoencoders may be used to perform a wireless communication task (e.g., CSF computation, positioning, and/or the like). The classifier may be used to select an autoencoder to use for the wireless communication task based at least in part on an observed environmental vector associated with the environment of the client. In some aspects, the classifier is used to select the autoencoder by determining the probability of choosing each of the autoencoders of the set of encoders for the task in the perceived environment. During the training, the autoencoders and the classifier are collaboratively learned using the federated learning techniques. In this way, aspects may facilitate better physical layer link performance.

In some aspects, a set of autoencoders may be employed at the client and a classifier may be employed for selecting among the autoencoders. The classifier may be used to select the autoencoder that works well in the perceived environment. An observed environmental vector may be provided as input to the classifier, which may include a classification network configured to output a probability vector indicating probabilities of selecting respective autoencoders. The classifier may select the autoencoder associated with the highest probability.

An observed wireless communication vector may be provided to the selected autoencoder, which may be configured to perform a wireless communication task such as, for example, by providing a latent vector. The client may provide an indication of the autoencoder (e.g., an autoencoder identifier (ID)) and the latent vector to the server, which may use a decoder corresponding to the selected autoencoder to recover the observed wireless communication vector. Aspects of the techniques described herein may be used for any number of cross-node machine learning challenges including, for example, facilitating channel state feedback, facilitating positioning of a client, learning of modulation and/or waveforms for wireless communication, and/or the like.

Figure 3:
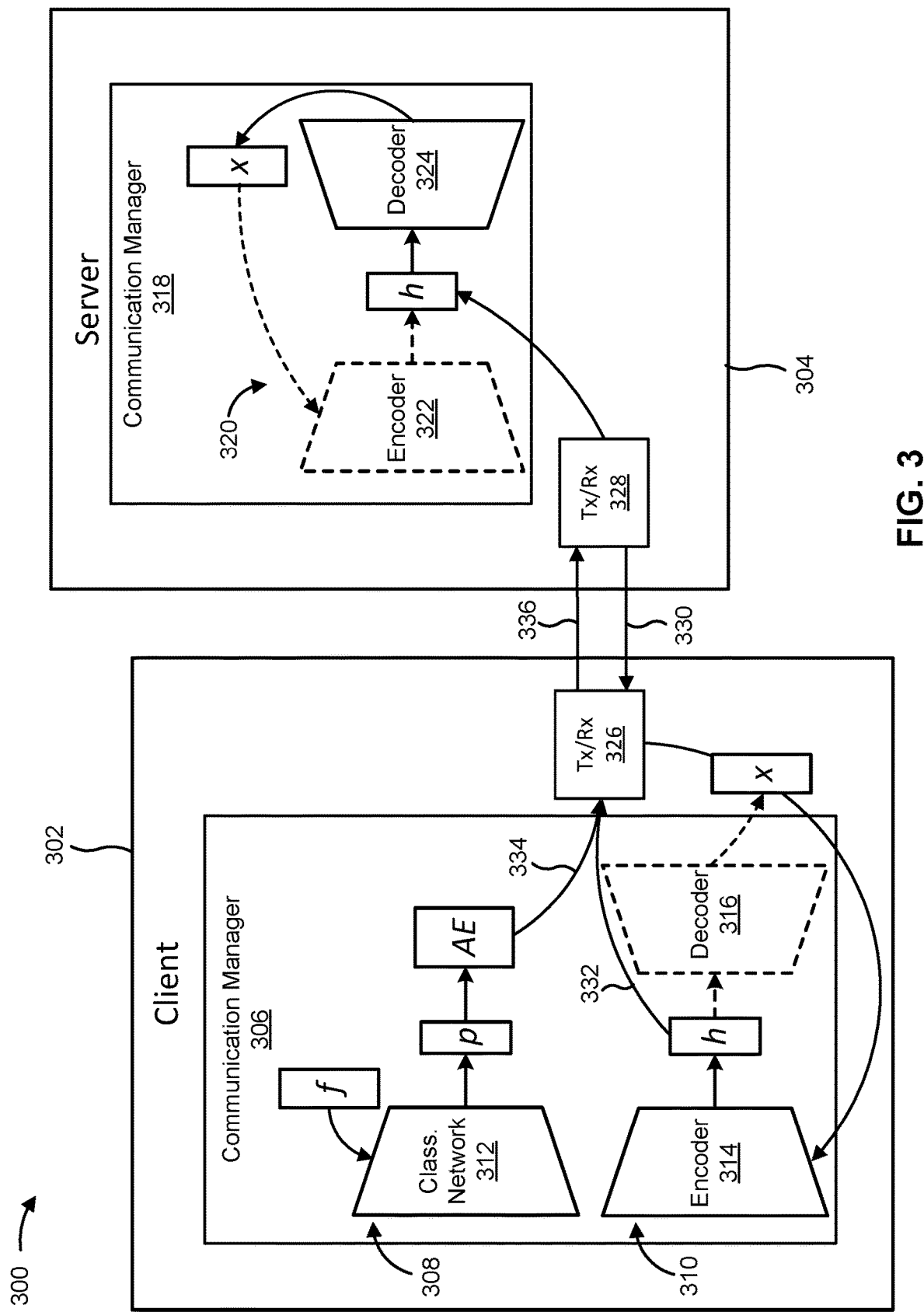
FIG. 3 is a diagram illustrating an example of wireless communication using a classifier and an associated set of autoencoders, in accordance with the present disclosure.

FIG. 3 is a diagram illustrating an example 300 of wireless communication using a classifier and an associated set of autoencoders, in accordance with the present disclosure. As shown, a client 302 and a server 304 may communicate with one another. In some aspects, the client 302 and the server 304 may communicate with one another via a wireless network (e.g., the wireless network 100 shown in FIG. 1). In some aspects, more than one client 302 and/or more than one server 304 may communicate with one another.

In some aspects, the client 302 may be, be similar to, include, or be included in a wireless communication device (e.g., a UE 120, a base station 110, an IAB node, and/or the like). In some aspects, the server 304 may be, be similar to, include, or be included in a wireless communication device (e.g., a UE 120, a base station 110, an IAB node, and/or the like). For example, in some aspects, the client 302 may be a UE 120 and the server 304 may be a base station, and the client 302 and the server 304 may communicate via an access link. In some aspects, the client 302 and the server 304 may be UEs 120 that communicate via a sidelink.

As shown, the client 302 may include a communication manager 306 (e.g., the communication manager 140 shown in FIG. 1) that may be configured to utilize a classifier 308 and a client autoencoder 310 to perform one or more wireless communication tasks. In some aspects, the classifier 308 may be, be similar to, include, or be included in, the classifier 510 shown in FIG. 5 and described below. In some aspects, the client autoencoder 310 may be, be similar to, include, or be included in, one or more of the autoencoders 520, 530, and 540 shown in FIG. 5 and described below.

As shown, the classifier 308 may include a classification network 312 configured to receive an observed environmental vector, f, as input and to provide a probability vector, p, as output. The classifier 308 also is configured to select an autoencoder identifier (ID) (shown as "AE") corresponding to the highest probability in the probability vector, p.

As shown, the client autoencoder 310 may include an encoder 314 configured to receive an observed wireless communication vector, x, as input and to provide a latent vector, h, as output. The client autoencoder 310 also may include a decoder 316 configured to receive the latent vector, h, as input and to provide the observed wireless communication vector, x, as output.

As shown in FIG. 3, the server 304 may include a communication manager 318 (e.g., the communication manager 150) that may be configured to utilize a server autoencoder 320 to perform one or more wireless communication tasks. For example, in some aspects, the server autoencoder 320 may correspond to the selected client autoencoder 310. In some aspects, the server autoencoder 320 may be, be similar to, include, or be included in, one or more of the autoencoders 520, 530, and 540 shown in FIG. 5 and described below. In some aspects, the communication manager 318 may select the autoencoder 320 from a set of server autoencoders based at least in part on the autoencoder ID, AE, corresponding to the selected client autoencoder 310.

In some aspects, the server autoencoder 320 may include an encoder 322 configured to receive the observed wireless communication vector, x, as input and to provide a latent vector, h, as output. The server autoencoder 320 also may include a decoder 324 configured to receive the latent vector, h, as input and to provide the observed wireless communication vector, x, as output.

As shown in FIG. 3, the client 302 may include a transceiver (shown as "Tx/Rx") 326 that may facilitate wireless communications with a transceiver 328 of the server 304. As shown by reference number 330, for example, the server 304 may transmit, using the transceiver 328, a wireless communication to the client 302. In some aspects, the wireless communication may include a reference signal such as a channel state information reference signal (CSI-RS). The transceiver 326 of the client 302 may receive the wireless communication. The communication manager 306 may determine an observed wireless communication vector, x, based at least in part on the wireless communication. For example, in aspects in which the wireless communication is a CSI-RS, the observed wireless communication vector, x, may include channel state information (CSI).

As shown, the communication manager 306 may obtain an observed environmental vector, f, and provide the observed environmental vector, f, to the classifier 308. The communication manager 306 may obtain the observed environmental vector from memory, from one or more sensors, and/or the like. As shown, the classification network 312 of the classifier 308 may determine, based at least in part on the observed environmental vector, f, a probability vector, p. As shown, the classifier 308 may select the autoencoder 310 based at least in part on the probability vector, p.

The communication manager 306 may provide, as input, the observed wireless communication vector, x, to the encoder 314 of the client autoencoder 310. The encoder 314 of the client autoencoder 310 may determine, based at least in part on the observed wireless communication vector, x, a latent vector, h. As shown by reference number 332, the communication manager 306 may provide the latent vector, h, to the transceiver 326 for transmission. As shown by reference number 334, the communication manager 306 also may provide the autoencoder ID to the transceiver 326 for transmission.

As shown by reference number 336, the transceiver 326 may transmit, and the transceiver 328 of the server 304 may receive, the autoencoder ID and the latent vector, h. As shown, the communication manager 318 of the server 304 may select the server autoencoder 320 based at least in part on the autoencoder ID, and may provide the latent vector, h, as input to the decoder 324 of the server autoencoder 320. The decoder 324 may determine (e.g., reconstruct) the observed wireless communication vector, x, based at least in part on the latent vector, h. In some aspects, the server 304 may perform a wireless communication action based at least in part on the observed wireless communication vector, x. For example, in aspects in which the observed wireless communication vector, x, comprises CSI, the communication manager 318 of the server 304 may use the CSI for communication grouping, beamforming, and/or the like.

As indicated above, FIG. 3 is provided merely as an example. Other examples may differ from what is described with regard to FIG. 3.

Figure 4:
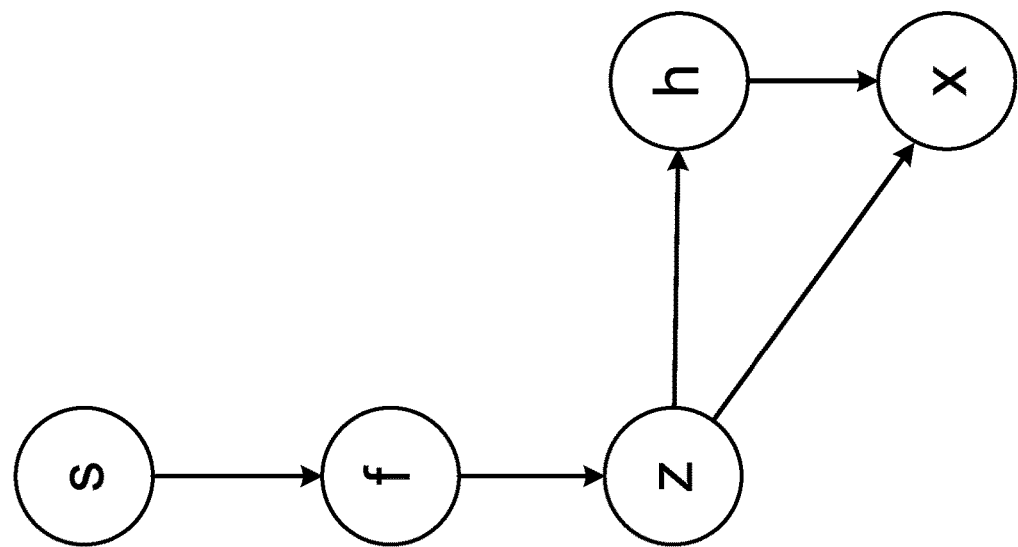
FIG. 4 is a diagram illustrating an example of a directed graphical model corresponding to a classifier and an associated set of autoencoders, in accordance with the present disclosure.

FIG. 4 is a diagram illustrating an example 400 of a directed graphical model corresponding to a classifier and an associated set of autoencoders, in accordance with the present disclosure. In some aspects, for example, the directed graphical model may correspond to the client autoencoder 310 shown in FIG. 3, the server autoencoder 320 shown in FIG. 3, and/or the like.

In some aspects, a data distribution at a client, s, may be represented by the directed graphical model shown in FIG. 4. The model provides an example of a representation of a relationship between the client, s; an observed wireless communication vector, x; a latent vector, h; an observed environmental vector, f, and a discrete variable, z, with K values that classifies the environment based on the observed environmental vector, f, where $z \in \{0, 1, \ldots, K-1\}$, and where K is the number of autoencoders in a set of autoencoders from which the classifier may select. In some aspects, the observed environmental vector, f, may include one or more variables that may be observed to facilitate learning the environment of the client, s.

In some aspects, the latent vector, h, may be associated with a wireless communication task. In some aspects, the wireless communication task may include determining channel state feedback (CSF), determining positioning information associated with the client, determining a modulation associated with a wireless communication, determining a waveform associated with a wireless communication, and/or the like.

For example, in some aspects, autoencoders may be used for compressing CSF for feeding back CSI to a server. In some aspects, the observed wireless communication vector, x, may comprise a propagation channel that the client (e.g., a UE 120) estimates based at least in part on a received CSI-RS. The latent vector, h, may comprise compressed CSF to be fed back to a server (e.g., a base station 110).

In some aspects, the observed environmental vector, f, may include any number of different types of information that a client (e.g., client 302 shown in FIG. 3) may obtain about an environment of the client. Information about the environment of the client may include information about the client (e.g., device information, configuration information, capability information, and/or the like), information about a state associated with the client (e.g., an operation state, a power state, an activation state, and/or the like), information about the location of the client (e.g., positioning information, orientation information, geographical information, motion information, and/or the like), information about an environment surrounding the client (e.g., weather information, information about obstacles to wireless signals surrounding the client, information about materials in the vicinity of the client, and/or the like), and/or the like. The observed environmental vector, f, may be formed by concatenating one or more information indications such as those listed above.

In some aspects, for example, the observed environmental vector, f, may include a client identifier (ID), a client antenna configuration, a large scale channel characteristic, a CSI-RS configuration, an image obtained by an imaging device, a portion of an estimated propagation channel, and/or the like. In some aspects, for example, the large scale channel characteristic may indicate a delay spread associated with a channel, a power delay profile associated with a channel, a Doppler measurement associated with a channel, a Doppler spectrum associated with a channel, a signal to noise ratio (SNR) associated with a channel, a signal to interference plus noise ratio (SINR) associated with a channel, a reference signal received power (RSRP), a received signal strength indicator (RSSI), and/or the like.

In some aspects, the graphical model shown in FIG. 4 may be used to derive a probabilistic expression related to using a corresponding classifier and an associated set of autoencoders in accordance with aspects discussed herein. For example, in some aspects, the graphical model may indicate the following conditional probability:

$$p(x,h,z,f|s)=p(x|h,z) \cdot p(h|z) \cdot p(z|f) \cdot p(f|s),$$

where p is a probability, x is an observed wireless communication vector, f is an observed environmental vector, h is a latent vector, z is a discrete variable that classifies the environment based on the observation off and s is the client. In some aspects, the conditional probability indicated by the directed graphical model may be used to configure training of classifiers and autoencoders.

As indicated above, FIG. 4 is provided merely as an example. Other examples may differ from what is described with regard to FIG. 4.

Figure 5:
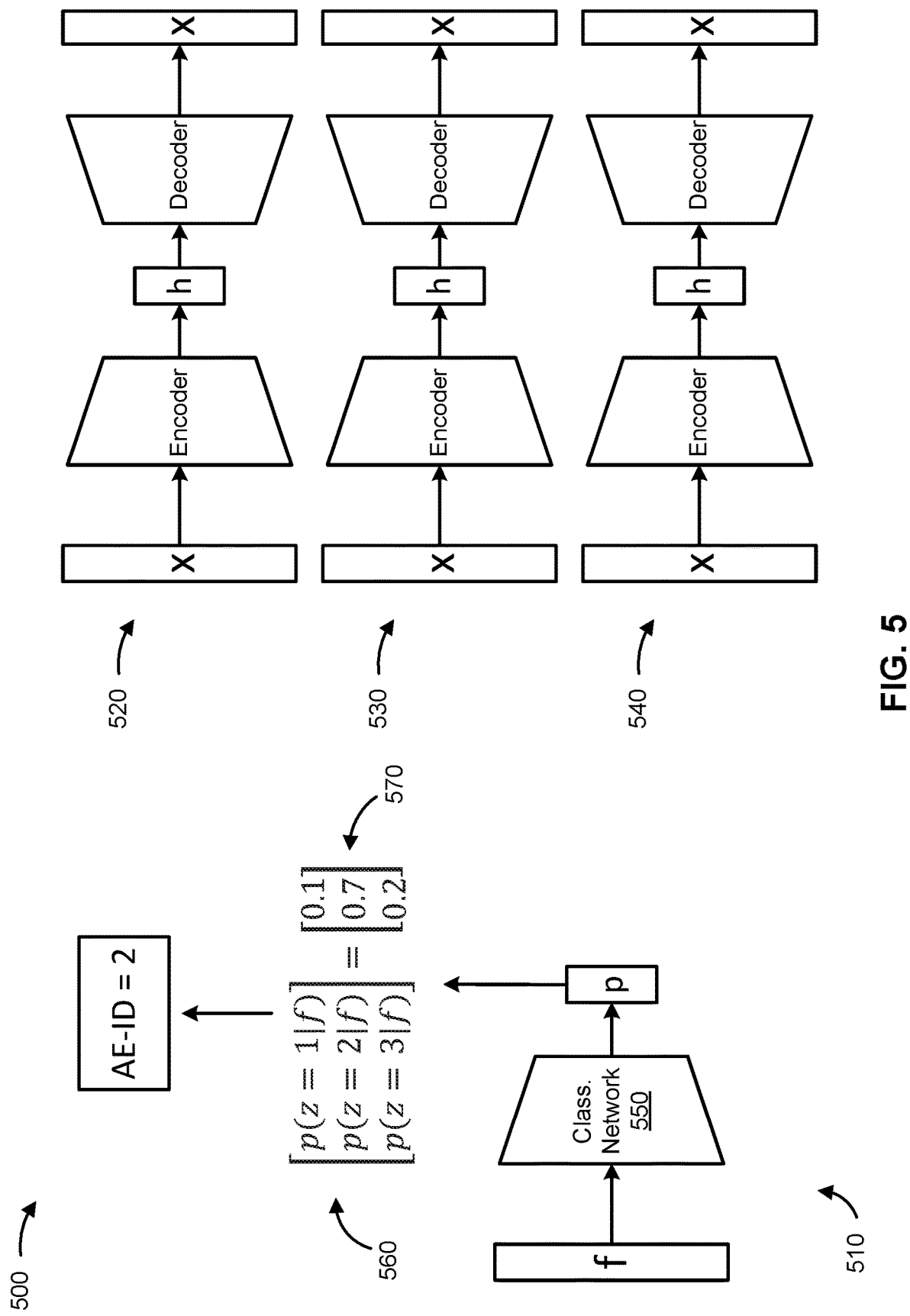
FIG. 5 is a diagram illustrating an example of a classifier and an associated set of autoencoders, in accordance with the present disclosure.

FIG. 5 is a diagram illustrating an example 500 of a classifier 510 and set of associated autoencoders 520, 530, and 540, in accordance with the present disclosure. Aspects of the example 500 may be implemented by a client (e.g., the client 302 shown in FIG. 3), a server (e.g., the server 304 shown in FIG. 3), and/or the like. The classifier and autoencoders shown in FIG. 5 may be used to implement aspects associated with the directed graphical model shown in FIG. 4.

As shown, the classifier 510 includes a classification network 550. The set of autoencoders includes a first autoencoder 520, a second autoencoder 530, and a third autoencoder 540. In some aspects, a set of autoencoders may include two autoencoders, more than three autoencoders, and/or the like. The autoencoders 520, 530, and 540 may be regular autoencoders, variational autoencoders, and/or the like.

The classifier 510 may include a classification network 550 configured to receive an observed environmental vector, f, as input and to provide a probability vector, p, as output. In some aspects, the last layer of the classification network 550 may include a softmax layer 560 with the length K probability vector, p, as its output. The k-the element of the probability vector, p, corresponds to probability of selecting the k-th autoencoder: p(z=k|f), where k indexes the autoencoder and may be referred to as an autoencoder identifier (ID).

As shown, each autoencoder 520, 530, and 540 may include an encoder configured to receive an observed wireless communication vector, x, as input and to provide a latent vector, h, as output. The autoencoders 520, 530, and 540 also may include a decoder configured to receive the latent vector, h, as input and to provide (e.g., recover) the observed wireless communication vector, x, as output. As shown by reference number 570, in the example, the autoencoder corresponding to the highest probability (0.7) is selected. In the example shown, the autoencoder ID (shown as "AE-ID") corresponding to the highest probability is 2, which may correspond, for example, to the autoencoder 530.

In some aspects, the set of autoencoders may include a conditional autoencoder, where a selected autoencoder comprises a state of the conditional autoencoder. For example, in some aspects, an encoder of the conditional autoencoder may take the selected autoencoder ID 570 as an input along with the observed wireless communication vector, x. Similarly, a decoder of the conditional autoencoder may take the selected autoencoder ID 570 as an input along with the latent vector, h.

According to various aspects, the classifier 510 and set of autoencoders 520-540 may be trained before being used for inference. Training the classifier, the set of autoencoders, or a combination thereof may include using an unsupervised learning procedure. Training the set of autoencoders may include using an observed wireless communication training vector, x. In some aspects, training the set of autoencoders may include determining a set of neural network parameters that maximize a variational lower bound function (e.g., an Evidence Lower Bound (ELBO) function) corresponding to the set of autoencoders. The variational lower bound function may be based at least in part on a set of conditional probabilities of selecting one or more autoencoders of the set of autoencoders and the reconstruction loss of one or more autoencoders of the set of autoencoders. In some aspects, the set of autoencoders may include a conditional autoencoder, and the variational lower bound function may be based at least in part on a set of conditional probabilities associated with one or more states of the conditional autoencoder and the reconstruction loss of the conditional autoencoder corresponding to one or more states.

For example, in some aspects, to find the ELBO on the evidence function, $\log p_{w,\theta}(x, f|s)$, a variational distribution may be introduced:

$$q_{\phi,w}(h,z|x,f)=q_\phi(h|x,z)p_w(z|f),$$

and the ELBO may be written as:

$$\mathcal{L}_{w,\theta,\phi} = \sum_{h,z} q_{\phi,w}(h, z|x, f) \log \left( \frac{p_\theta(x|h, z) \cdot p_\theta(h|z) \cdot p_w(z|f) \cdot p(f|s)}{q_{\phi,w}(h, z|x, f)} \right),$$

where $\phi$ represents the parameters for the encoders, $\theta$ represents the parameters for the decoders, and w represents the parameters for the classifier. The ELBO may be simplified to:

$$\mathcal{L}_{w,\theta,\phi}=\Sigma_{z=1}^K p_w(z|f)[E_{h \sim q_\phi(h|x,z)}\{\log p_\theta(x|h,z)\}-KL(q_\phi(h|x,z)\|p_\theta(h|z))]+p(f|s),$$

which may allow the ELBO to be rewritten as:

$$\mathcal{L}_{w,\theta,\phi}=\Sigma_{z=1}^K p_w(z|f) \cdot \bar{L}_{\theta,\phi}(z)+\log p(f|s),$$

where $$\bar{L}_{\theta,\phi}(z):=\Sigma_{h \sim q_\phi(h|x,z)}\{\log p_\theta(x|h,z)\}-KL(q_\phi(h|x,z)\|p_\theta(h|z)),$$

and where $p_w(z|f)$ is parameterized by the classifier network, and its last layer is the soft-max layer; $q_\phi(h|x,z)$ is parameterized by the encoder of the autoencoder; $p_\theta(x|h, z)$ is parameterized by the decoder of the autoencoder; $p_\theta(h|z)$ is parameterized by a "prior network" to train the autoencoder; $E_{h \sim q_\phi(h|x,z)}\{\log p_\theta(x|h, z)\}$ is the reconstruction loss for the autoencoder; and KL $(q_\phi(h|x, z)\|p_\theta(h|z))$ is the regularization term for the autoencoder.

In some aspects, it may be desired to find the neural network parameters $\theta$ and $\phi$ that maximizes the ELBO, $\mathcal{L}_{w,\theta,\phi}$. The los function, $\mathcal{F}_{w,\theta,\phi}$ may be defined as (this is related to variational free energy):

$$\mathcal{F}_{w,\theta,\phi}=-\Sigma_{z=1}^K p_w(z|f) \cdot \bar{L}_{\theta,\phi}(z),$$

where $\mathcal{F}_{w,\theta,\phi}$ is used as a loss function in the training, and a stochastic gradient descent (SGD) algorithm may be used to optimize the neural network parameters w, θ and ϕ. The label z can be viewed as selecting one of the K autoencoders, or conditioning a Conditional Variational Autoencoder (CVAE). As a result, $(-\tilde{L}_{\theta,\phi}(z))$ can be viewed as a loss function for the z-th autoencoders.

In some aspects, there may be K variational autoencoders (VAE). During the training, each of the K autoencoders is trained using the same observed wireless communication vector, x. The total loss function $\mathcal{F}_{w,\theta,\phi}$ may be computed by weighting the K loss values, $\{(-\tilde{L}_{\theta,\phi}(z))\}_{z=1}^{K}$ by the softmax layer outputs ($p_w(z|f)$) of the classification network. In some aspects, the regularization term KL ($q_\phi$(h|x, z)$\|p_\theta$ (h|z)) may be optional. If the regularization term is not included in a loss function, the corresponding variational autoencoders are reduced to regular autoencoders.

As with the Expectation-Maximization (EM) algorithm, training can be done alternately between the classification network (parameter w) and the K autoencoders (parameters θ, ϕ). The mapping of the observed environmental vector, f, to the label z may be learned by joint training of the classifier and the autoencoders. In some aspects, training may be accomplished using unsupervised learning.

During the inference, a client may use the neural network parameters for the classifier and the K autoencoders. At the client, the classifier may determine the probability of selecting each autoencoder. The client may select the autoencoder corresponding to the highest probability. For example, in some aspects, the index of the selected $$\text{auto encoder} = \arg\max_{k} p_w(z = k|f).$$

At the client, the encoder of the selected autoencoder may be used in computing the latent vector. The client may report the latent vector and the index of the selected autoencoder to the server. The server selects an autoencoder corresponding to the received autoencoder ID, and decodes the received latent vector, using the decoder of the selected autoencoder. In the discussions herein, the parameters for the k-th autoencoder may be denoted by ($\phi_k$, $\theta_k$), for k=1, 2, . . . , K.

As indicated above, FIG. 5 is provided merely as an example. Other examples may differ from what is described with regard to FIG. 5.

Figure 6:
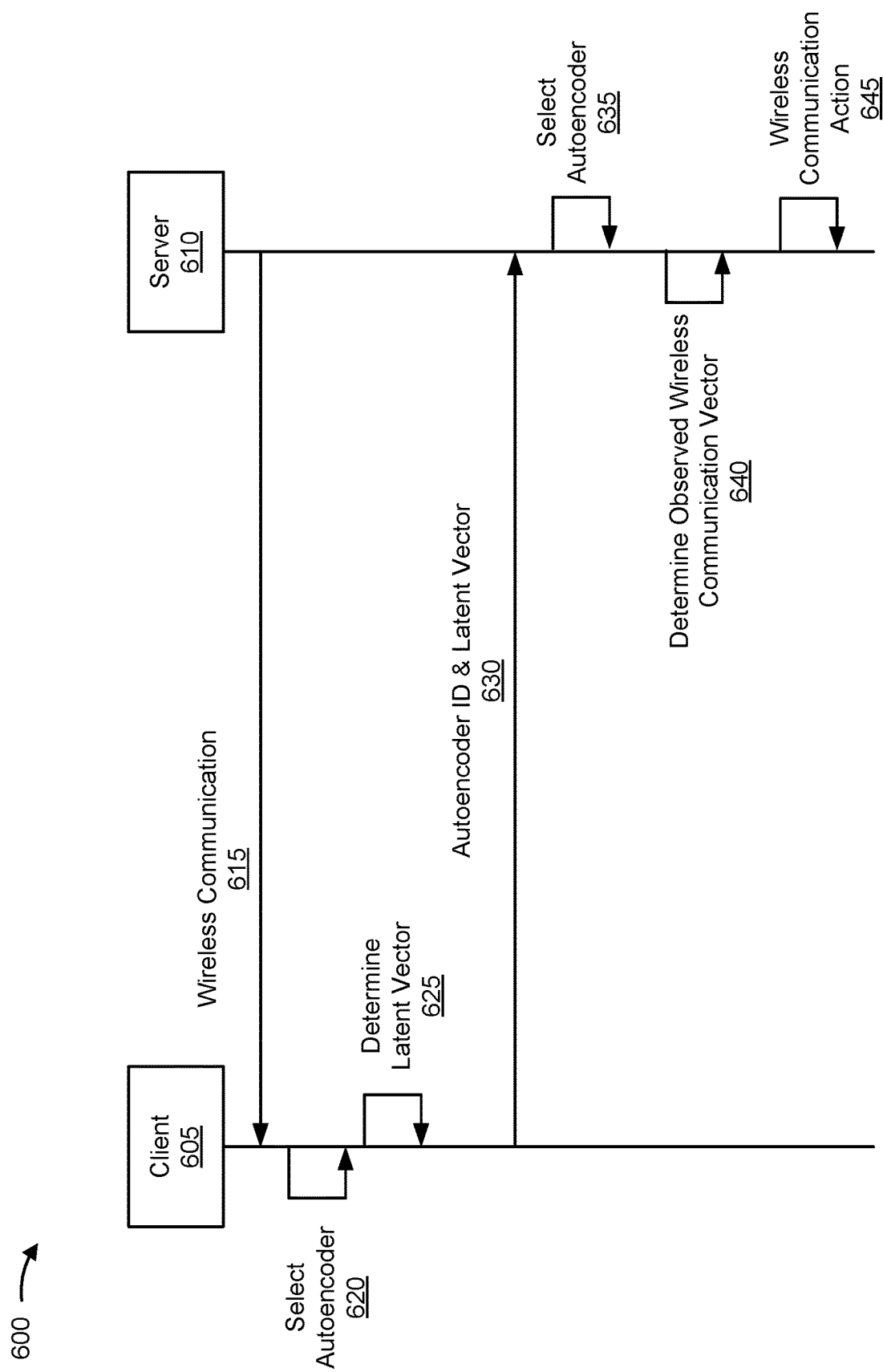
FIG. 6 is a diagram illustrating an example of wireless communication using a classifier and an associated set of autoencoders, in accordance with the present disclosure.

FIG. 6 is a diagram illustrating an example 600 of wireless communication using classifier and associated set of autoencoders, in accordance with the present disclosure. As shown, a client 605 and a server 610 may communicate with one another. In some aspects, the client 605 may be, be similar to, include, or be included in the client 302 shown in FIG. 3. In some aspects, the server 610 may be, be similar to, include, or be included in the server 304 shown in FIG. 3.

As shown by reference number 615, the server 610 may transmit, and the client 605 may receive, a wireless communication. In some aspects, the wireless communication may include a reference signal (e.g., a CSI-RS, and/or the like), a data communication, a control communication, and/or the like. In some aspects, the wireless communication may be carried using a physical downlink control channel (PDCCH), a physical downlink shared channel (PDSCH), a physical sidelink control channel (PSCCH), a physical sidelink shared channel (PSSCH), and/or the like.

As shown by reference number 620, the client 605 may select an autoencoder based at least in part on one or more features associated with an environment of the client 605. As shown by reference number 625, the client 605 may determine a latent vector. For example, in some aspects, the client may determine the latent vector using a selected autoencoder (e.g., the autoencoder 520, 530, or 540 shown in FIG. 5, the client autoencoder 310 shown in FIG. 3, and/or the like).

As shown by reference number 630, the client 605 may transmit, and the server 610 may receive, the autoencoder ID and the latent vector. In some aspects, the autoencoder ID and the latent vector may be carried in a physical uplink control channel (PUCCH), a physical uplink shared channel (PUSCH), and/or the like. As shown by reference number 635, the server 610 may select an autoencoder based at least in part on the received autoencoder ID. As shown by reference number 640, the server 610 may determine the observed wireless communication vector based at least in part on the latent vector. For example, in some aspects, the server 610 may use a decoder of an autoencoder (e.g., the autoencoder 520, 530, or 540 shown in FIG. 5, the server autoencoder 320 shown in FIG. 3, and/or the like) to determine the observed wireless communication vector. As shown by reference number 645, the server may perform a wireless communication action based at least in part on determining the observed wireless communication vector.

As indicated above, FIG. 6 is provided merely as an example. Other examples may differ from what is described with regard to FIG. 6.

Figure 7:
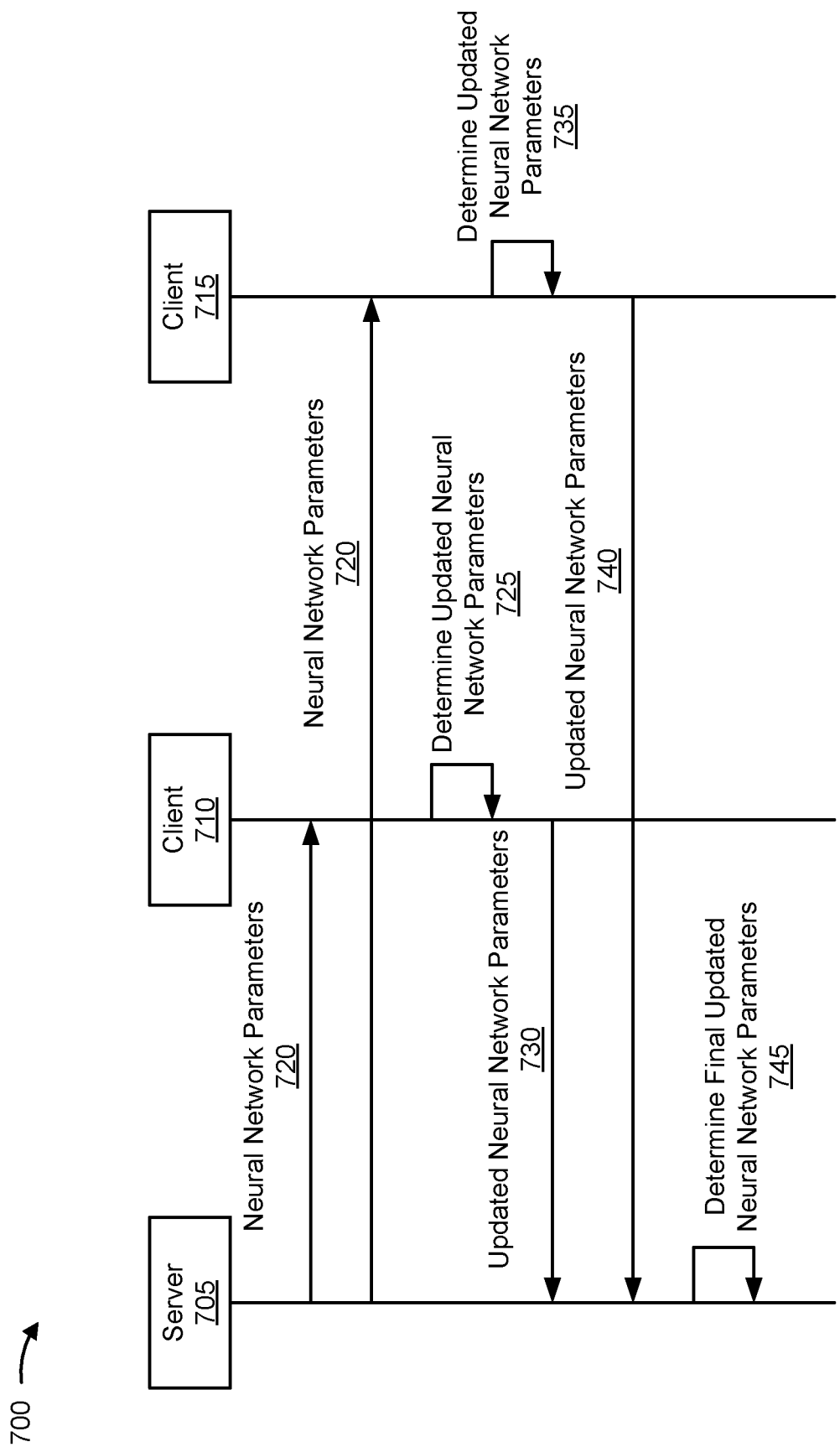
FIG. 7 is a diagram illustrating an example of fully federated learning for a classifier and an associated set of autoencoders, in accordance with the present disclosure.

FIG. 7 is a diagram illustrating an example 700 of fully federated learning for a classifier and associated set of autoencoders, in accordance with the present disclosure. As shown, a server 705, a client 710, and a client 715 may communicate with one another. In some aspects, the server 705 may be, be similar to, include, or be included in the server 610 shown in FIG. 6, the server 304 shown in FIG. 3, and/or the like. In some aspects, the client 710 and/or the client 715 may be, be similar to, include, or be included in the client 605 shown in FIG. 6, the client 302 shown in FIG. 3, and/or the like. In some aspects, any number of additional clients may communicate with the server 705.

In some aspects, fully federated learning may include jointly training a classifier and the set of associated autoencoders. In fully federated learning, both classifiers and autoencoders are trained by clients. In some aspects, fully federated learning may include alternating between training a classifier and training autoencoders. In some aspects, a classification mapping may change slowly since the client features chosen for the observed vector, f, may be relatively static or change slowly.

As shown by reference number 720, the server 705 may transmit, to a set of clients (e.g., the client 710 and the client 715), a set of neural network parameters (e.g., the parameters, w, θ and ϕ), described above, in connection with FIG. 5). The neural network parameters may correspond to a classifier and a set of client autoencoders. As shown by reference number 725, the first client 710 may determine a set of updated neural network parameters. As shown by reference number 730, the first client 710 may transmit, and the server 705 may receive, the set of updated neural network parameters.

As shown by reference number 735, the second client 715 also may determine a set of updated neural network parameters. As shown by reference number 740, the second client 715 may transmit, and the server 705 may receive, the set of updated neural network parameters. As shown by reference number 745, the server 705 may determine a "final" set of updated neural network parameters. The server 705 may determine the final set of updated neural network parameters by averaging the updated neural network parameters received from the clients 710 and 715. The server 705 may use the final set of updated neural network parameters to update the server autoencoders, the classifier, and the client autoencoders.

As indicated above, FIG. 7 is provided merely as an example. Other examples may differ from what is described with regard to FIG. 7.

Figure 8:
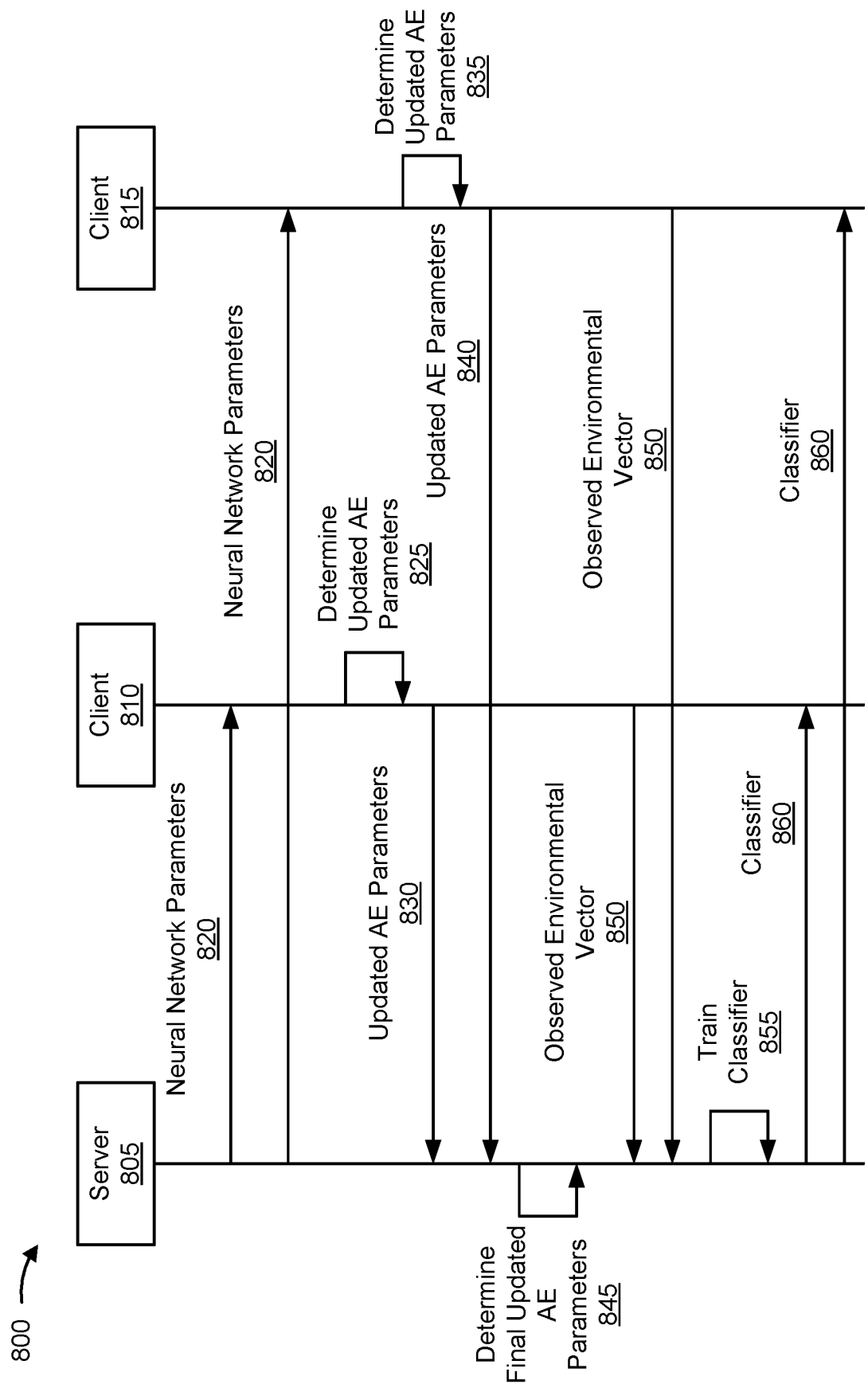
FIG. 8 is a diagram illustrating an example of partially federated learning for a classifier and an associated set of autoencoders, in accordance with the present disclosure.

FIG. 8 is a diagram illustrating an example of partially federated learning for a classifier and a set of associated autoencoders, in accordance with the present disclosure. As shown, a server 805, a client 810, and a client 815 may communicate with one another. In some aspects, the server 805 may be, be similar to, include, or be included in the server 610 shown in FIG. 6, the server 304 shown in FIG. 3, and/or the like. In some aspects, the client 810 and/or the client 815 may be, be similar to, include, or be included in the client 605 shown in FIG. 6, the client 302 shown in FIG. 3, and/or the like. In some aspects, any number of additional clients may communicate with the server 805.

In some aspects, a partially federated learning procedure may include centralized learning for training a classifier, while the autoencoders are locally trained. In some aspects, the server 805 may update the classifier with a lower frequency than the autoencoders. For example, the clients 810 and 815 may provide observed environmental vectors to the server 805 for training the classifier infrequently.

As shown by reference number 820, the server 805 may transmit, and the clients 810 and 815 may receive, neural network parameters (e.g., the parameters w, $\theta$ and $\phi$, described above, in connection with FIG. 5). As shown by reference number 825, the client 810 may determine updated autoencoder parameters (shown as "AE parameters"). As shown by reference number 830, the client 810 may transmit, and the server 805 may receive, the updated autoencoder parameters.

As shown by reference number 835, the client 815 may determine updated autoencoder parameters (shown as "AE parameters"). As shown by reference number 840, the client 815 may transmit, and the server 805 may receive, the updated autoencoder parameters. As shown by reference number 845, the server 805 may determine final updated autoencoder parameters associated with the autoencoders. The server 805 may use the final updated autoencoder parameters associated with the autoencoders to update the server autoencoders and the client autoencoders.

As shown by reference number 850, the client 810 and the client 815 may transmit, and the server 805 may receive, observed environmental vectors. In some aspects, the clients 810 and 815 may provide the observed environmental vectors to the server 805 for training of a classifier by the server 805. As shown by reference number 855, the server 805 may train the classifier. The server 805 may train the classifier based at least in part on the environmental vectors. As shown by reference number 860, the server 805 may transmit, and the clients 810 and 815 may receive, the classifier.

As indicated above, FIG. 8 is provided merely as an example. Other examples may differ from what is described with regard to FIG. 8.

Figure 9:
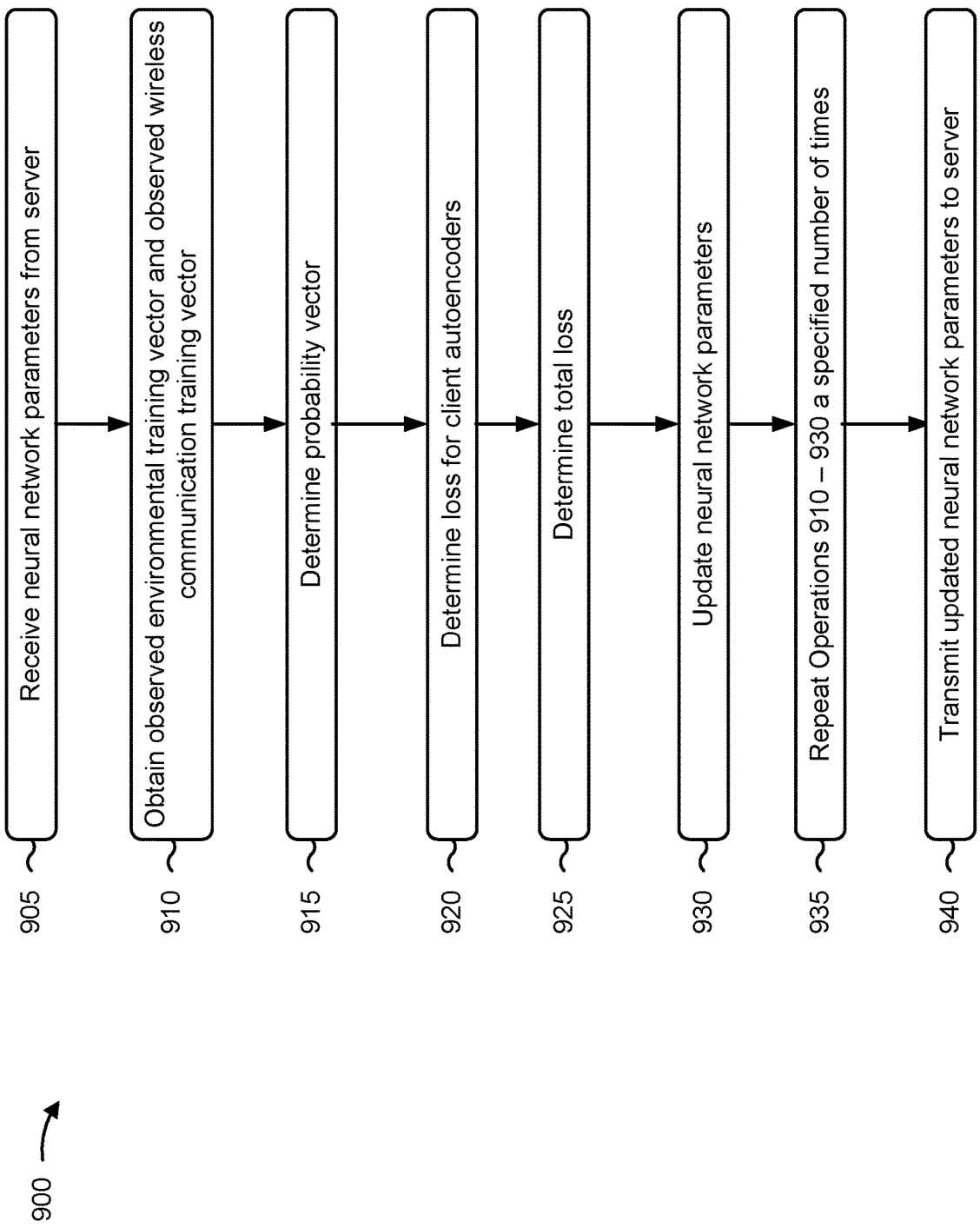
FIGS. 9-14 are diagrams illustrating examples of federated learning for a classifier and an associated set of autoencoders, in accordance with the present disclosure.

FIG. 9 is a diagram illustrating an example process 900 of fully federated learning for a classifier and a set of associated autoencoders, in accordance with the present disclosure. The process 900 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 900 may include receiving neural network parameters from a server (block 905). In some aspects, the neural network parameters may include a set of neural network parameters for the classifier and the K autoencoders, (w, $\{\phi_k, \theta_k\}_{k=1}^{K}$). The process may further include obtaining an observed environmental vector and an observed wireless communication vector (block 910). For example, the client may obtain an observed environmental training vector, f, and an observed wireless communication training vector, x.

As shown, the process 900 may include determining a probability vector (block 915). For example, in some aspects, the client may determine the probability vector, p, by inputting the observed environmental training vector, f, to the classifier. The process 900 may further include determining a loss for each of the client autoencoders (block 920). For example, the client may input the observed wireless communication training vector, x, to the encoder of the k-th autoencoder to determine a training latent vector, h. The client may input the training latent vector, h, to a decoder of the k-th autoencoder to determine a training output of the k-th autoencoder. The client may determine the k-th loss associated with the k-th autoencoder based at least in part on the training output. In some aspects, the k-th loss may be associated with the set of neural network parameters. In some aspects, the client may determine a regularization term corresponding to the k-th autoencoder. The client may determine the k-th loss based at least in part on the regularization term. This operation may be repeated for all K autoencoders of the set of autoencoders.

The process 900 may further include determining a total loss (block 925). In some aspects, the client may combine the K loss values by weighting them using the probability vector, p, to obtain the total loss. The process 900 may include updating the neural network parameters (block 930). In some aspects, the client may update the neural network parameters by determining a plurality of gradients of the total loss with respect to the set of neural network parameters and update the set of neural network parameters based at least in part on the plurality of gradients.

In some aspects, the process 900 may further include repeating operations 910-930 a specified number of times (block 935). For example, the client may update the set of neural network parameters a specified number of times to determine a final set of updated neural network parameters. The process 900 may include providing the updated neural network parameters to the server (block 940). For example, the client may transmit the final set of updated neural network parameters to the server.

As indicated above, FIG. 9 is provided merely as an example. Other examples may differ from what is described with regard to FIG. 9.

Figure 10:
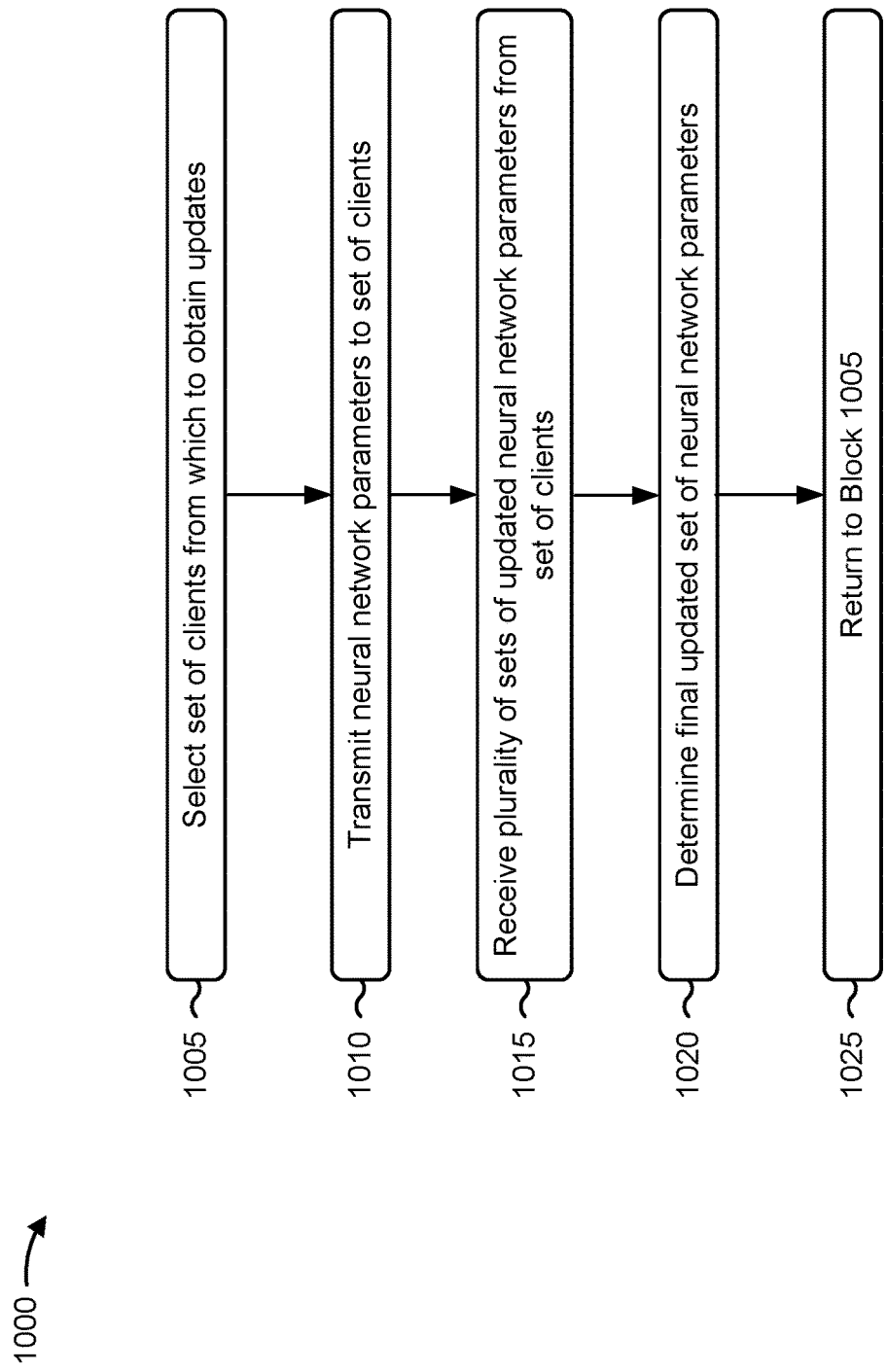

FIG. 10 is a diagram illustrating an example process 1000 of fully federated learning for a classifier and a set of associated autoencoders, in accordance with the present disclosure. The process 1000 is an aspect of a fully federated learning process that may be performed, for example, by a server (e.g., server 705 shown in FIG. 7, server 610 shown in FIG. 6, server 304 shown in FIG. 3, and/or the like).

The process 1000 may include selecting a set of clients from which to obtain updates (block 1005) and transmitting a set of neural network parameters to the set of clients (block 1010). The set of neural network parameters may include a classifier parameter and a set of autoencoder parameters. The server may receive a plurality of sets of updated neural network parameters from the set of clients (block 1015). The process 1000 may include determining a final set of updated neural network parameters based at least in part on the plurality of sets of updated neural network parameters (block 1020). The process 1000 may further include returning to block 1005 (block 1025) to perform the process 1000 again, with a different selection of clients.

As indicated above, FIG. 10 is provided merely as an example. Other examples may differ from what is described with regard to FIG. 10.

Figure 11:
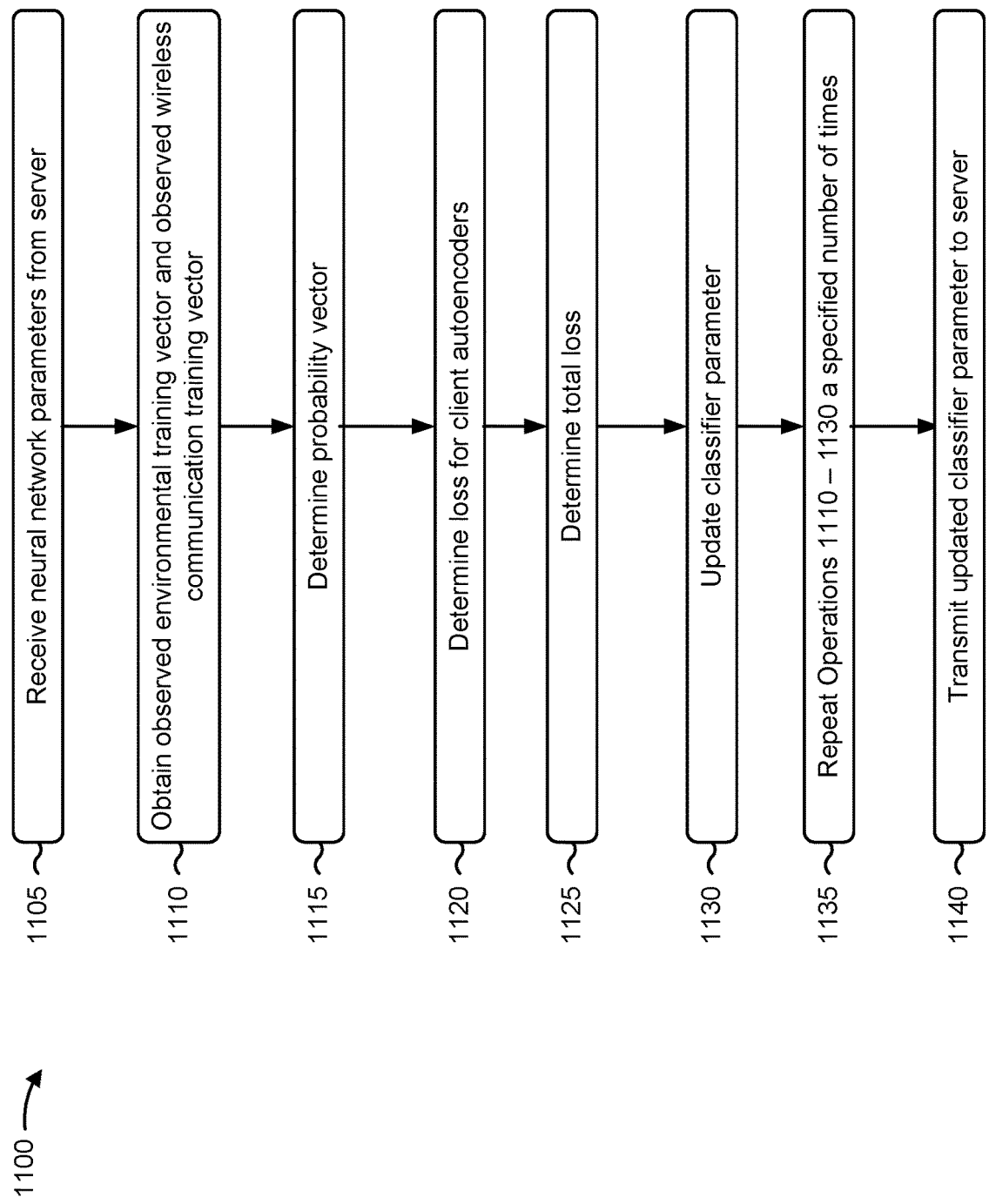

FIG. 11 is a diagram illustrating an example process 1100 of fully federated learning for a classifier and a set of associated autoencoders, in accordance with the present disclosure. The process 1100 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 1100 may include receiving neural network parameters from a server (block 1105). In some aspects, the neural network parameters may include a set of neural network parameters for the classifier and the K autoencoders, (w, $\{\phi_k, \theta_k\}_{k=1}^{K}$). The process may further include obtaining an observed environmental vector and an observed wireless communication vector (block 1110). For example, the client may obtain an observed environmental training vector, f, and an observed wireless communication training vector, x.

As shown, the process 1100 may include determining a probability vector (block 1115). For example, in some aspects, the client may determine the probability vector, p, by inputting the observed environmental training vector, f, to the classifier. The process 1100 may further include determining a loss for each of the client autoencoders (block 1120). For example, the client may input the observed wireless communication training vector, x, to the encoder of the k-th autoencoder to determine a training latent vector, h. The client may input the training latent vector, h, to a decoder of the k-th autoencoder to determine a training output of the k-th autoencoder. The client may determine the k-th loss associated with the k-th autoencoder based at least in part on the training output. In some aspects, the k-th loss may be associated with the set of neural network parameters. In some aspects, the client may determine a regularization term corresponding to the k-th autoencoder. The client may determine the k-th loss based at least in part on the regularization term. This operation may be repeated for all K autoencoders of the set of autoencoders.

The process 1100 may further include determining a total loss (block 1125). In some aspects, the client may combine the K loss values by weighting them using the probability vector, p, to obtain the total loss. The process 1100 may include updating the classifier parameter, w. (block 1130). In some aspects, the client may update the classifier parameter by determining a plurality of gradients of the total loss with respect to the set of classifier parameters and update the classifier parameter based at least in part on the plurality of gradients.

In some aspects, the process 1100 may further include repeating operations 1110-1130 a specified number of times (block 1135). For example, the client may update the classifier parameter a specified number of times to determine a final updated classifier parameter. The process 1100 may include providing the updated classifier parameter to the server (block 1140). For example, the client may transmit the final updated classifier parameter to the server.

As indicated above, FIG. 11 is provided merely as an example. Other examples may differ from what is described with regard to FIG. 11.

Figure 12:
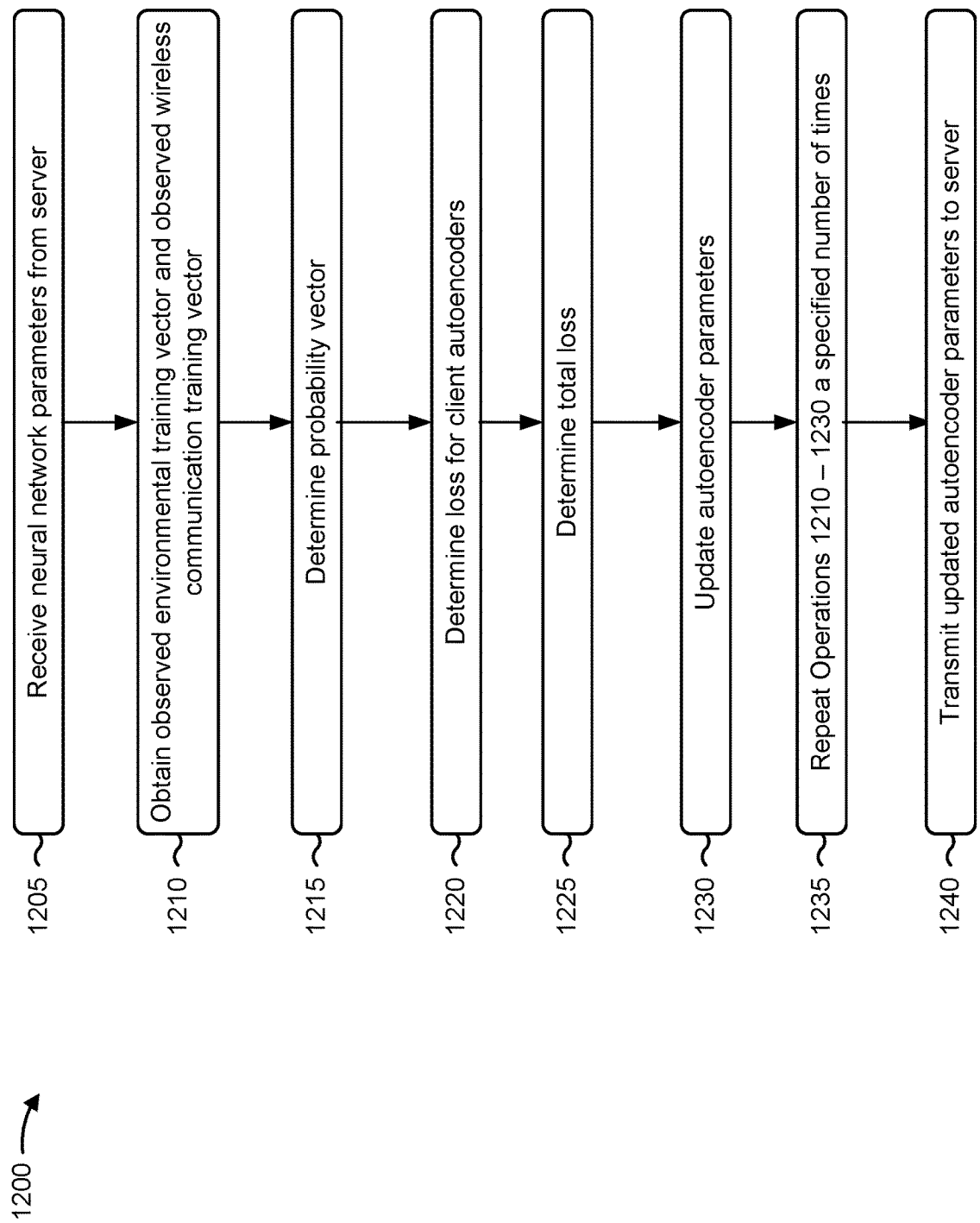

FIG. 12 is a diagram illustrating an example process 1200 of fully federated learning for a classifier and a set of associated autoencoders, in accordance with the present disclosure. The process 1200 is an aspect of a fully federated learning process that may be performed, for example, by a client (e.g., client 710 shown in FIG. 7, client 715 shown in FIG. 7, client 605 shown in FIG. 6, client 302 shown in FIG. 3, and/or the like).

The process 1200 may include receiving neural network parameters from a server (block 1205). In some aspects, the neural network parameters may include a set of neural network parameters for the classifier and the K autoencoders, (w, $\{\phi_k, \theta_k\}_{k=1}^{K}$). The process may further include obtaining an observed environmental vector and an observed wireless communication vector (block 1210). For example, the client may obtain an observed environmental training vector, f, and an observed wireless communication training vector, x.

As shown, the process 1200 may include determining a probability vector (block 1215). For example, in some aspects, the client may determine the probability vector, p, by inputting the observed environmental training vector, f, to the classifier. The process 1200 may further include determining a loss for each of the client autoencoders (block 1220). For example, the client may input the observed wireless communication training vector, x, to the encoder of the k-th autoencoder to determine a training latent vector, h. The client may input the training latent vector, h, to a decoder of the k-th autoencoder to determine a training output of the k-th autoencoder. The client may determine the k-th loss associated with the k-th autoencoder based at least in part on the training output. In some aspects, the k-th loss may be associated with the set of neural network parameters. In some aspects, the client may determine a regularization term corresponding to the k-th autoencoder. The client may determine the k-th loss based at least in part on the regularization term. This operation may be repeated for all K autoencoders of the set of autoencoders.

The process 1200 may further include determining a total loss (block 1225). In some aspects, the client may combine the K loss values by weighting them using the probability vector, p, to obtain the total loss. The process 1200 may include updating the autoencoder parameters (block 1230). In some aspects, the client may update the autoencoder parameters by determining a plurality of gradients of the total loss with respect to the set of autoencoder parameters and update the set of autoencoder parameters based at least in part on the plurality of gradients.

In some aspects, the process 1200 may further include repeating operations 1210-1230 a specified number of times (block 1235). For example, the client may update the set of autoencoder parameters a specified number of times to determine a final set of updated autoencoder parameters. The process 1200 may include providing the updated autoencoder parameters to the server (block 1240). For example, the client may transmit the final set of updated autoencoder parameters to the server.

As indicated above, FIG. 12 is provided merely as an example. Other examples may differ from what is described with regard to FIG. 12.

Figure 13:
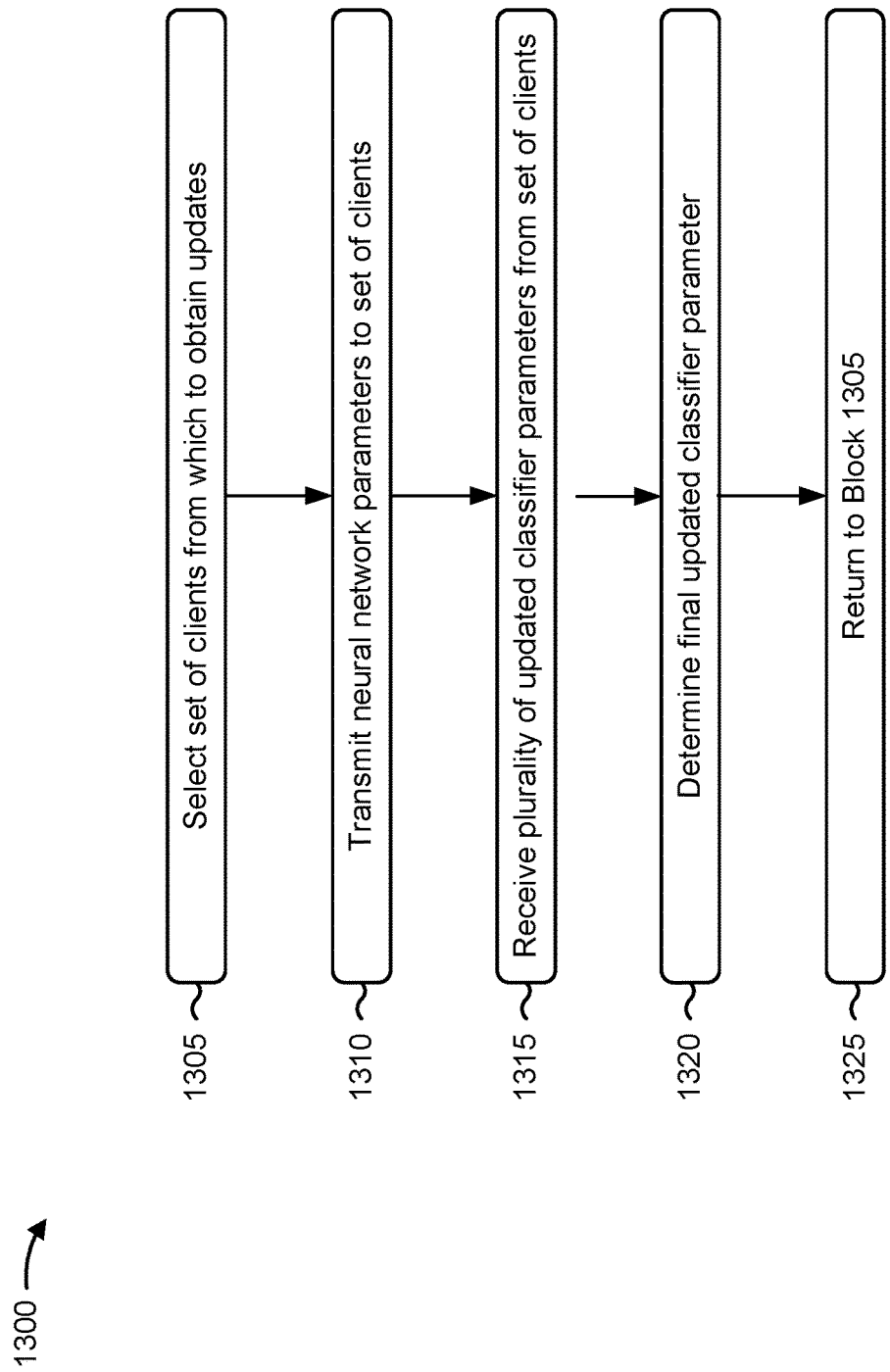

FIG. 13 is a diagram illustrating an example process 1300 of fully federated learning for a classifier and a set of associated autoencoders, in accordance with the present disclosure. The process 1300 is an aspect of a fully federated learning process that may be performed, for example, by a server (e.g., server 705 shown in FIG. 7, server 610 shown in FIG. 6, server 304 shown in FIG. 3, and/or the like).

The process 1300 may include selecting a set of clients from which to obtain updates (block 1305) and transmitting a set of neural network parameters to the set of clients (block 1310). The set of neural network parameters may include a classifier parameter and a set of autoencoder parameters. The server may receive a plurality of sets of updated classifier parameters from the set of clients (block 1315). The process 1300 may include determining a final set of updated classifier parameters based at least in part on the plurality of sets of updated classifier parameters (block 1320). The process 1300 may further include returning to block 1305 (block 1325) to perform the process 1300 again, with a different selection of clients.

As indicated above, FIG. 13 is provided merely as an example. Other examples may differ from what is described with regard to FIG. 13.

Figure 14:
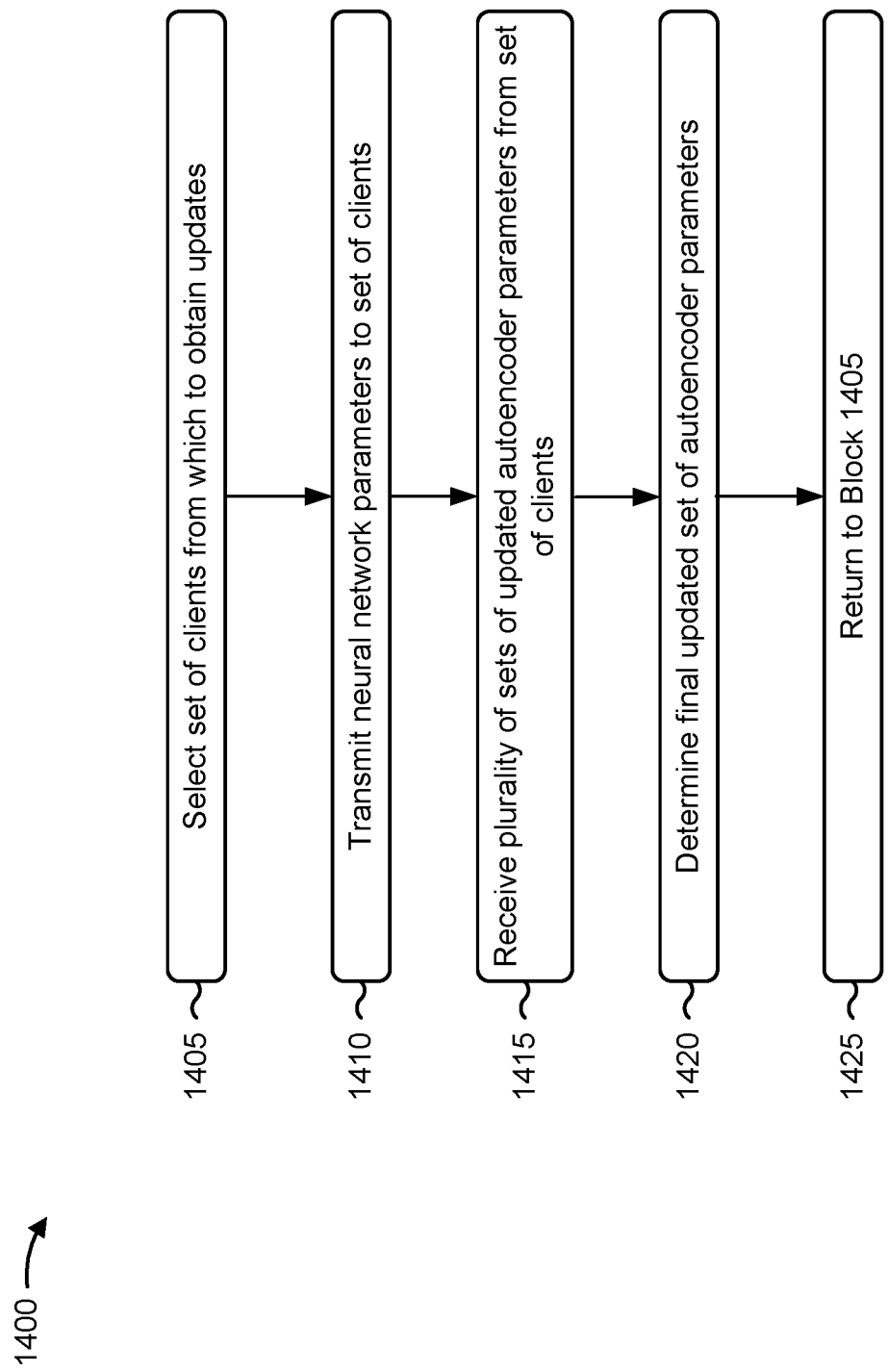

FIG. 14 is a diagram illustrating an example process 1400 of fully federated learning for a classifier and a set of associated autoencoders, in accordance with the present disclosure. The process 1400 is an aspect of a fully federated learning process that may be performed, for example, by a server (e.g., server 705 shown in FIG. 7, server 610 shown in FIG. 6, server 304 shown in FIG. 3, and/or the like).

The process 1400 may include selecting a set of clients from which to obtain updates (block 1405) and transmitting a set of neural network parameters to the set of clients (block 1410). The set of neural network parameters may include a classifier parameter and a set of autoencoder parameters. The server may receive a plurality of sets of updated autoencoder parameters from the set of clients (block 1415). The process 1400 may include determining a final set of updated autoencoder parameters based at least in part on the plurality of sets of updated autoencoder parameters (block 1420). The process 1400 may further include returning to block 1405 (block 1425) to perform the process 1400 again, with a different selection of clients.

As indicated above, FIG. 14 is provided merely as an example. Other examples may differ from what is described with regard to FIG. 14.

Figure 15:
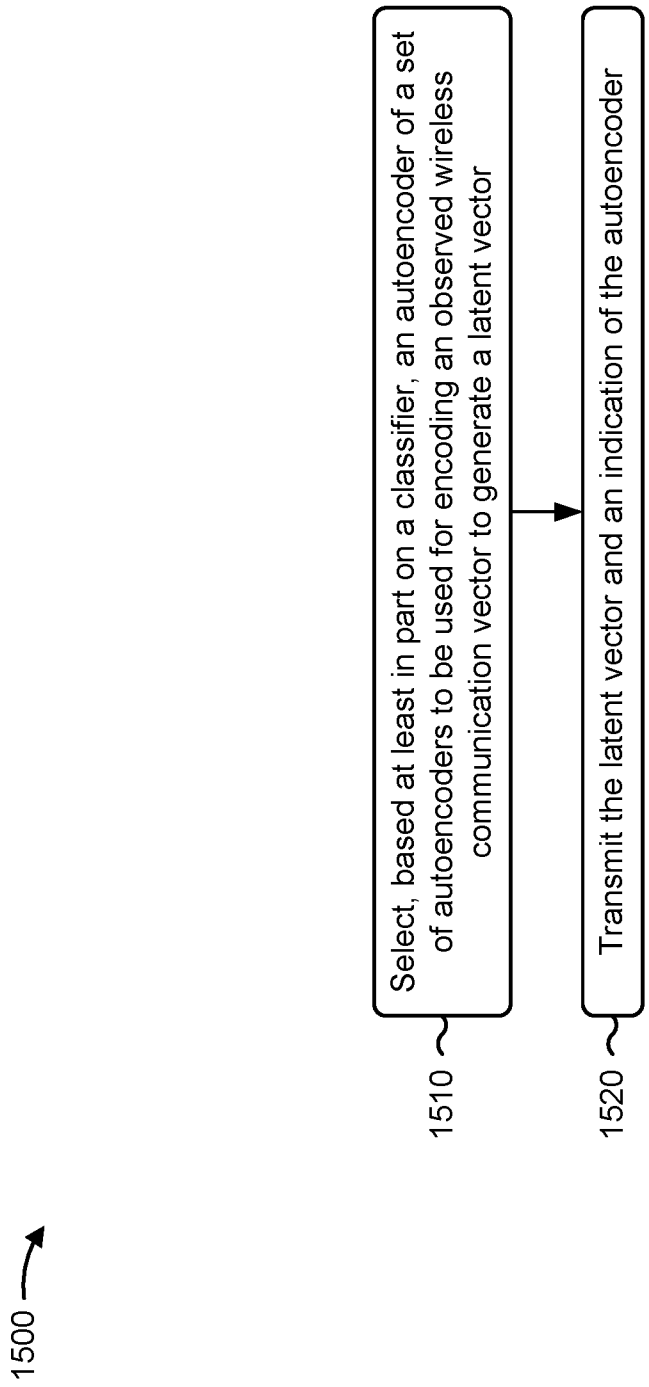
FIGS. 15 and 16 are diagrams illustrating example processes associated with federated learning for classifiers and associated autoencoders, in accordance with the present disclosure.

FIG. 15 is a diagram illustrating an example process 1500 performed, for example, by a client, in accordance with the present disclosure. Example process 1500 is an example where the client (e.g., client 302 shown in FIG. 3) performs operations associated with federated learning for classifiers and autoencoders for wireless communication.

As shown in FIG. 15, in some aspects, process 1500 may include selecting, based at least in part on a classifier, an autoencoder of a set of autoencoders to be used for encoding an observed wireless communication vector to generate a latent vector (block 1510). For example, the client (e.g., using communication manager 1704 of FIG. 17) may select, based at least in part on a classifier, an autoencoder of a set of autoencoders to be used for encoding an observed wireless communication vector to generate a latent vector, as described above.

As further shown in FIG. 15, in some aspects, process 1500 may include transmitting the latent vector and an indication of the autoencoder (block 1520). For example, the client (e.g., using transmission component 1706 of FIG. 17) may transmit the latent vector and an indication of the autoencoder, as described above.

Process 1500 may include additional aspects, such as any single aspect or any combination of aspects described below and/or in connection with one or more other processes described elsewhere herein.

In a first aspect, selecting the autoencoder comprises determining, using the classifier, a set of probabilities corresponding to the set of autoencoders, identifying a maximum probability of the set of probabilities, and determining that the maximum probability corresponds to the autoencoder, wherein selecting the autoencoder comprises selecting the autoencoder based at least in part on determining that the maximum probability corresponds to an autoencoder identifier associated with the autoencoder.

In a second aspect, alone or in combination with the first aspect, determining the set of probabilities comprises providing an observed environmental vector as input to the classifier.

In a third aspect, alone or in combination with one or more of the first and second aspects, the observed environmental vector comprises one or more feature components, wherein the one or more feature components indicate a client vendor identifier, a client antenna configuration, a large scale channel characteristic, a channel state information reference signal configuration, an image obtained by an imaging device, a portion of an estimated propagation channel, or a combination thereof.

In a fourth aspect, alone or in combination with one or more of the first through third aspects, the large scale channel characteristic indicates at least one of a delay spread associated with a channel, a power delay profile associated with a channel, a Doppler measurement associated with a channel, a Doppler spectrum associated with a channel, an SNR associated with a channel, an SINR associated with a channel, an RSRP, an RSSI, or a combination thereof.

In a fifth aspect, alone or in combination with one or more of the first through fourth aspects, a last layer of the classifier comprises a softmax layer that outputs a probability vector indicating a set of probabilities corresponding to the set of autoencoders.

In a sixth aspect, alone or in combination with one or more of the first through fifth aspects, the autoencoder comprises an encoder configured to receive the observed wireless communication vector as input and to provide the latent vector as output, and a decoder configured to receive the latent vector as input and to provide the observed wireless communication vector as output.

In a seventh aspect, alone or in combination with one or more of the first through sixth aspects, the set of autoencoders comprises a conditional autoencoder, and the autoencoder comprises a state of the conditional autoencoder.

In an eighth aspect, alone or in combination with one or more of the first through seventh aspects, the conditional autoencoder comprises an encoder configured to receive the indication of the autoencoder and the observed wireless communication vector as input and to provide the latent vector as output, and a decoder configured to receive the indication of the autoencoder and the latent vector as input and to provide the observed wireless communication vector as output.

In a ninth aspect, alone or in combination with one or more of the first through eighth aspects, the latent vector is associated with a wireless communication task.

In a tenth aspect, alone or in combination with one or more of the first through ninth aspects, the wireless communication task comprises at least one of determining CSF, determining positioning information associated with the client, determining a modulation associated with a wireless communication, determining a waveform associated with a wireless communication, or a combination thereof.

In an eleventh aspect, alone or in combination with one or more of the first through tenth aspects, the wireless communication task comprises determining the CSF, and process 1500 includes receiving a CSI-RS, determining CSI based at least in part on the CSI-RS, and providing the CSI as input to the autoencoder.

In a twelfth aspect, alone or in combination with one or more of the first through eleventh aspects, the latent vector comprises compressed CSF.

In a thirteenth aspect, alone or in combination with one or more of the first through twelfth aspects, transmitting the latent vector and the indication of the autoencoder comprises transmitting the latent vector and the indication of the autoencoder using at least one of a PUCCH, a PUSCH, or a combination thereof.

In a fourteenth aspect, alone or in combination with one or more of the first through thirteenth aspects, the set of autoencoders comprises a regular autoencoder, a variational autoencoder, or a combination thereof.

In a fifteenth aspect, alone or in combination with one or more of the first through fourteenth aspects, process 1500 includes training the classifier, the set of autoencoders, or a combination thereof.

In a sixteenth aspect, alone or in combination with one or more of the first through fifteenth aspects, training the classifier, the set of autoencoders, or a combination thereof comprises using an unsupervised learning procedure.

In a seventeenth aspect, alone or in combination with one or more of the first through sixteenth aspects, process 1500 includes training the set of autoencoders using an observed wireless communication training vector.

In an eighteenth aspect, alone or in combination with one or more of the first through seventeenth aspects, training the set of autoencoders comprises determining a set of neural network parameters that maximize a variational lower bound function corresponding to the set of autoencoders.

In a nineteenth aspect, alone or in combination with one or more of the first through eighteenth aspects, the variational lower bound function is based at least in part on a set of conditional probabilities of selecting one or more autoencoders of the set of autoencoders, and the reconstruction loss of one or more autoencoders of the set of autoencoders.

In a twentieth aspect, alone or in combination with one or more of the first through nineteenth aspects, the set of autoencoders comprises a conditional autoencoder, and the variational lower bound function is based at least in part on a set of conditional probabilities associated with one or more states of the conditional autoencoder, and the reconstruction loss of the conditional autoencoder corresponding to one or more states.

In a twenty-first aspect, alone or in combination with one or more of the first through twentieth aspects, the variational lower bound function includes a regularization term for at least one autoencoder of the set of autoencoders.

In a twenty-second aspect, alone or in combination with one or more of the first through twenty-first aspects, the at least one autoencoder is a regular autoencoder, and the variational lower bound function does not include a regularization term.

In a twenty-third aspect, alone or in combination with one or more of the first through twenty-second aspects, process 1500 includes training the classifier and the set of autoencoders using a federated learning procedure.

In a twenty-fourth aspect, alone or in combination with one or more of the first through twenty-third aspects, the federated learning procedure comprises a fully federated learning procedure.

In a twenty-fifth aspect, alone or in combination with one or more of the first through twenty-fourth aspects, training the classifier and the set of autoencoders using the fully federated learning procedure comprises jointly training the classifier and the set of autoencoders.

In a twenty-sixth aspect, alone or in combination with one or more of the first through twenty-fifth aspects, jointly training the set of autoencoders and the classifier comprises mapping an observed environmental training vector to an autoencoder selection label.

In a twenty-seventh aspect, alone or in combination with one or more of the first through twenty-sixth aspects, training the classifier and the set of autoencoders using the fully federated learning procedure comprises alternating between training the classifier and training the set of autoencoders.

In a twenty-eighth aspect, alone or in combination with one or more of the first through twenty-seventh aspects, alternating between training the classifier and training the set of autoencoders comprises performing a first plurality of training iterations associated with the classifier according to a first training frequency, and performing a second plurality of training iterations associated with the set of autoencoders according to a second training frequency that is higher than the first training frequency.

In a twenty-ninth aspect, alone or in combination with one or more of the first through twenty-eighth aspects, training the classifier and the set of autoencoders using the federated learning procedure comprises performing a partial federated learning procedure.

In a thirtieth aspect, alone or in combination with one or more of the first through twenty-ninth aspects, performing the partial federated learning procedure comprises providing an observed environmental training vector to a server, and receiving the classifier from the base station, wherein the classifier is based at least in part on the observed environmental training vector.

In a thirty-first aspect, alone or in combination with one or more of the first through thirtieth aspects, the classifier is based at least in part on at least one additional environmental vector associated with at least one additional client.

In a thirty-second aspect, alone or in combination with one or more of the first through thirty-first aspects, performing the partial federated learning procedure comprises updating the set of autoencoders to determine a set of updated autoencoder parameters, and transmitting the set of updated autoencoder parameters to a server.

In a thirty-third aspect, alone or in combination with one or more of the first through thirty-second aspects, performing the partial federated learning procedure comprises performing a first plurality of training iterations associated with the classifier according to a first training frequency, wherein performing a training iteration of the first plurality of training iterations comprises providing an observed environmental training vector to a server, and receiving an updated classifier from the server, wherein the updated classifier is based at least in part on the observed environmental training vector, and performing a second plurality of training iterations associated with the set of autoencoders according to a second training frequency that is higher than the first training frequency.

In a thirty-fourth aspect, alone or in combination with one or more of the first through thirty-third aspects, process 1500 includes determining a plurality of gradients of the set of losses with respect to a set of autoencoder parameters, and updating the set of autoencoder parameters based at least in part on the plurality of gradients.

In a thirty-fifth aspect, alone or in combination with one or more of the first through thirty-fourth aspects, process 1500 includes updating the set of autoencoder parameters a specified number of times to determine a final set of updated autoencoder parameters.

In a thirty-sixth aspect, alone or in combination with one or more of the first through thirty-fifth aspects, process 1500 includes transmitting the final set of updated autoencoder parameters to the server.

In a thirty-seventh aspect, alone or in combination with one or more of the first through thirty-sixth aspects, process 1500 includes receiving, from a server, a set of neural network parameters corresponding to the classifier and the set of autoencoders, wherein the set of neural network parameters includes a classifier parameter and a set of autoencoder parameters, obtaining an observed environmental training vector, and inputting the observed environmental training vector to the classifier to determine a training probability vector.

In a thirty-eighth aspect, alone or in combination with one or more of the first through thirty-seventh aspects, process 1500 includes obtaining an observed wireless communication training vector, inputting the observed wireless communication training vector to a set of encoders of the set of autoencoders to determine a set of training latent vectors, inputting the set of training latent vectors to a set of decoders of the set of autoencoders to determine a set of training outputs of the set of autoencoders, and determining a set of losses associated with the set of autoencoders based at least in part on a set of training outputs, wherein the set of losses are associated with the set of neural network parameters.

In a thirty-ninth aspect, alone or in combination with one or more of the first through thirty-eighth aspects, process 1500 includes determining a set of regularization terms corresponding to the set of autoencoders, wherein determining the set of losses comprises determining the set of losses based at least in part on the set of regularization terms.

In a fortieth aspect, alone or in combination with one or more of the first through thirty-ninth aspects, process 1500 includes determining a total loss based at least in part on the set of losses and the training probability vector.

In a forty-first aspect, alone or in combination with one or more of the first through fortieth aspects, process 1500 includes determining a plurality of gradients of the total loss with respect to the set of neural network parameters, and updating the set of neural network parameters based at least in part on the plurality of gradients.

In a forty-second aspect, alone or in combination with one or more of the first through forty-first aspects, process 1500 includes updating the set of neural network parameters a specified number of times to determine a final set of updated neural network parameters.

In a forty-third aspect, alone or in combination with one or more of the first through forty-second aspects, process 1500 includes transmitting the final set of updated neural network parameters to the server.

In a forty-fourth aspect, alone or in combination with one or more of the first through forty-third aspects, process 1500 includes determining a first plurality of gradients of the total loss with respect to the classifier parameter, and updating the classifier parameter based at least in part on the first plurality of gradients.

In a forty-fifth aspect, alone or in combination with one or more of the first through forty-fourth aspects, process 1500 includes updating the classifier parameter a specified number of times to determine a final updated classifier parameter.

In a forty-sixth aspect, alone or in combination with one or more of the first through forty-fifth aspects, process 1500 includes transmitting the final updated classifier parameter to the server.

In a forty-seventh aspect, alone or in combination with one or more of the first through forty-sixth aspects, process 1500 includes determining a second plurality of gradients of the total loss with respect to the set of autoencoder parameters, and updating the set of autoencoder parameters based at least in part on the second plurality of gradients.

In a forty-eighth aspect, alone or in combination with one or more of the first through forty-seventh aspects, process 1500 includes updating the set of autoencoder parameters a specified number of times to determine a final set of updated autoencoder parameters.

In a forty-ninth aspect, alone or in combination with one or more of the first through forty-eighth aspects, process 1500 includes transmitting the final set of updated autoencoder parameters to the server.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
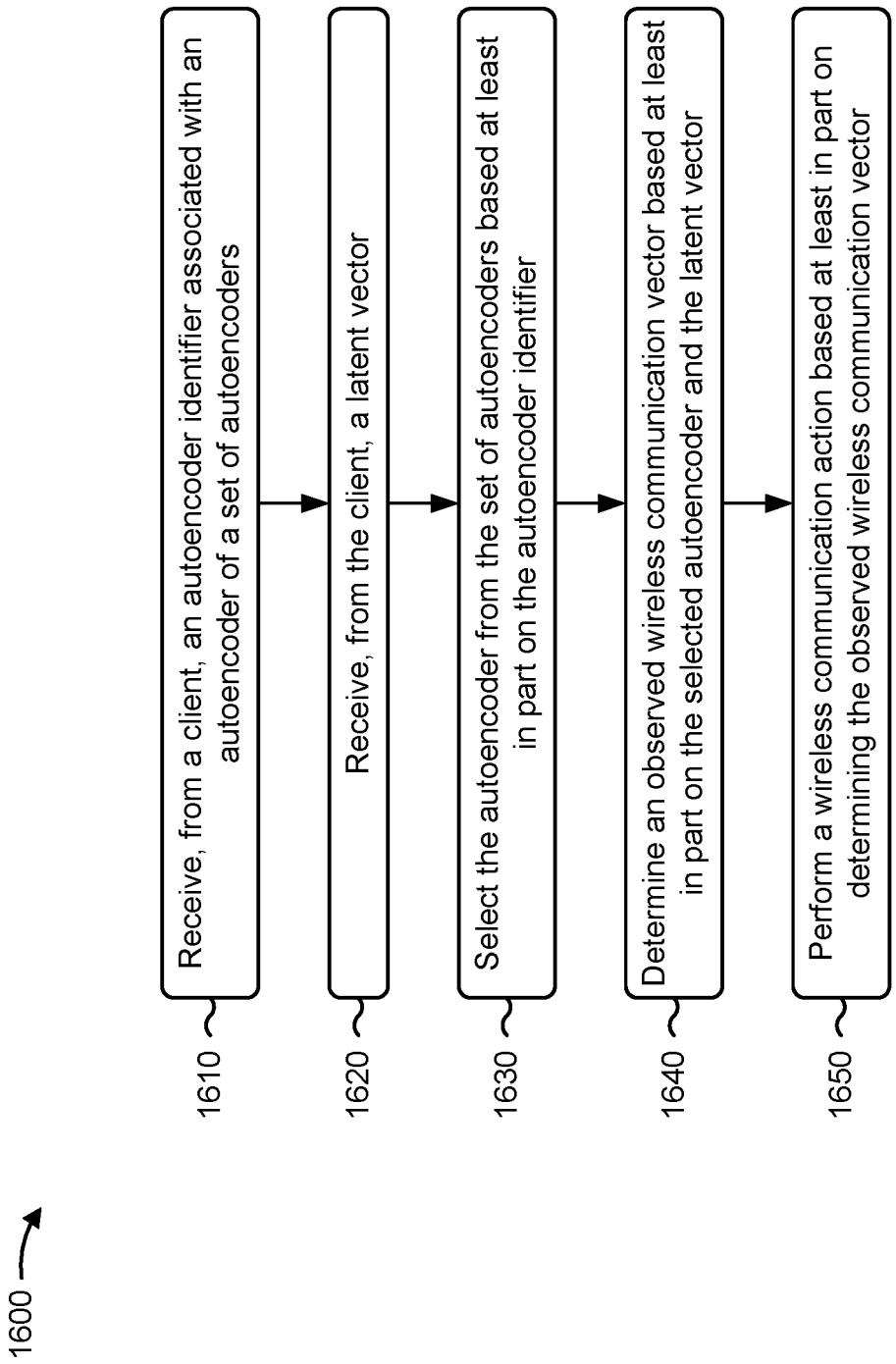

FIG. 16 is a diagram illustrating an example process 1600 performed, for example, by a server, in accordance with the present disclosure. Example process 1600 is an example where the server (e.g., server 304 shown in FIG. 3) performs operations associated with federated learning for classifiers and autoencoders for wireless communication.

As shown in FIG. 16, in some aspects, process 1600 may include receiving, from a client, an autoencoder identifier associated with an autoencoder of a set of autoencoders (block 1610). For example, the server (e.g., using reception component 1902 of FIG. 19) may receive, from a client, an autoencoder identifier associated with an autoencoder of a set of autoencoders, as described above.

As further shown in FIG. 16, in some aspects, process 1600 may include receiving, from the client, a latent vector (block 1620). For example, the server (e.g., using reception component 1902 of FIG. 19) may receive, from the client, a latent vector, as described above.

As further shown in FIG. 16, in some aspects, process 1600 may include selecting the autoencoder from the set of autoencoders based at least in part on the autoencoder identifier (block 1630). For example, the server (e.g., using communication manager 1904 of FIG. 19) may select the autoencoder from the set of autoencoders based at least in part on the autoencoder identifier, as described above.

As further shown in FIG. 16, in some aspects, process 1600 may include determining an observed wireless communication vector based at least in part on the selected autoencoder and the latent vector (block 1640). For example, the server (e.g., using communication manager 1904 of FIG. 19) may determine an observed wireless communication vector based at least in part on the selected autoencoder and the latent vector, as described above.

As further shown in FIG. 16, in some aspects, process 1600 may include performing a wireless communication action based at least in part on determining the observed wireless communication vector (block 1650). For example, the server (e.g., using communication manager 1904 of FIG. 19) may perform a wireless communication action based at least in part on determining the observed wireless communication vector, as described above.

Process 1600 may include additional aspects, such as any single aspect or any combination of aspects described below and/or in connection with one or more other processes described elsewhere herein.

In a first aspect, the autoencoder identifier corresponds to a maximum probability of a set of probabilities corresponding to the set of autoencoders.

In a second aspect, alone or in combination with the first aspect, the set of probabilities are based at least in part on a classifier.

In a third aspect, alone or in combination with one or more of the first and second aspects, the classifier is configured to receive an observed environmental vector as input and to provide the set of probabilities as output.

In a fourth aspect, alone or in combination with one or more of the first through third aspects, the observed environmental vector comprises one or more feature components, wherein the one or more feature components indicate a client vendor identifier, a client antenna configuration, a large scale channel characteristic, a channel state information reference signal configuration, an image obtained by an imaging device, a portion of an estimated propagation channel, or a combination thereof.

In a fifth aspect, alone or in combination with one or more of the first through fourth aspects, the large scale channel characteristic indicates at least one of a delay spread associated with a channel, a power delay profile associated with a channel, a Doppler measurement associated with a channel, a Doppler spectrum associated with a channel, an SNR associated with a channel, an SINR associated with a channel, an RSRP, an RSSI, or a combination thereof.

In a sixth aspect, alone or in combination with one or more of the first through fifth aspects, a last layer of the classifier comprises a softmax layer that outputs a probability vector indicating the set of probabilities corresponding to the set of autoencoders.

In a seventh aspect, alone or in combination with one or more of the first through sixth aspects, the autoencoder comprises an encoder configured to receive the observed wireless communication vector as input and to provide the latent vector as output, and a decoder configured to receive the latent vector as input and to provide the observed wireless communication vector as output.

In an eighth aspect, alone or in combination with one or more of the first through seventh aspects, the set of autoencoders comprises a conditional autoencoder, and the selected autoencoder comprises a state of the conditional autoencoder.

In a ninth aspect, alone or in combination with one or more of the first through eighth aspects, the conditional autoencoder comprises an encoder configured to receive the indication of the autoencoder and the observed wireless communication vector as input and to provide the latent vector as output, and a decoder configured to receive the indication of the autoencoder and the latent vector as input and to provide the observed wireless communication vector as output.

In a tenth aspect, alone or in combination with one or more of the first through ninth aspects, the latent vector is associated with a wireless communication task corresponding to the client.

In an eleventh aspect, alone or in combination with one or more of the first through tenth aspects, the wireless communication task comprises at least one of determining CSF, determining positioning information associated with the client, determining a modulation associated with a wireless communication, determining a waveform associated with a wireless communication, or a combination thereof.

In a twelfth aspect, alone or in combination with one or more of the first through eleventh aspects, the wireless communication task comprises determining the CSF, and process 1600 includes transmitting a CSI-RS, wherein the observed wireless communication vector comprises CSI based at least in part on the CSI-RS.

In a thirteenth aspect, alone or in combination with one or more of the first through twelfth aspects, the latent vector comprises compressed CSF.

In a fourteenth aspect, alone or in combination with one or more of the first through thirteenth aspects, the latent vector and the autoencoder identifier are carried using at least one of a PUCCH, a PUSCH, or a combination thereof.

In a fifteenth aspect, alone or in combination with one or more of the first through fourteenth aspects, the set of autoencoders comprises a regular autoencoder, a variational autoencoder, or a combination thereof.

In a sixteenth aspect, alone or in combination with one or more of the first through fifteenth aspects, process 1600 includes training the classifier.

In a seventeenth aspect, alone or in combination with one or more of the first through sixteenth aspects, training the classifier comprises using an unsupervised learning procedure.

In an eighteenth aspect, alone or in combination with one or more of the first through seventeenth aspects, training the classifier comprises performing a partial federated learning procedure.

In a nineteenth aspect, alone or in combination with one or more of the first through eighteenth aspects, performing the partial federated learning procedure comprises receiving an observed environmental training vector from the client, and transmitting the classifier to the client, wherein the classifier is based at least in part on the observed environmental training vector.

In a twentieth aspect, alone or in combination with one or more of the first through nineteenth aspects, the classifier is based at least in part on at least one additional environmental vector associated with at least one additional client.

In a twenty-first aspect, alone or in combination with one or more of the first through twentieth aspects, performing the partial federated learning procedure comprises receiving a plurality of sets of updated neural network parameters from the client and at least one additional client.

In a twenty-second aspect, alone or in combination with one or more of the first through twenty-first aspects, process 1600 includes selecting a set of clients from which to obtain updates, wherein the set of clients includes the client, transmitting a set of neural network parameters to the set of clients, wherein the set of neural network parameters comprises a classifier parameter and a set of autoencoder parameters, receiving a plurality of sets of updated neural network parameters from the set of clients, and determining a final set of updated neural network parameters based at least in part on the plurality of sets of updated neural network parameters.

In a twenty-third aspect, alone or in combination with one or more of the first through twenty-second aspects, determining the final set of updated neural network parameters comprises averaging the plurality of sets of updated neural network parameters.

In a twenty-fourth aspect, alone or in combination with one or more of the first through twenty-third aspects, process 1600 includes selecting a set of clients from which to obtain updates, wherein the set of clients includes the client, transmitting a set of neural network parameters to the set of clients, wherein the set of neural network parameters comprises a classifier parameter and a set of autoencoder parameters, receiving a plurality of updated classifier parameters from the set of clients, and determining a final updated classifier parameter based at least in part on the plurality of updated classifier parameters.

In a twenty-fifth aspect, alone or in combination with one or more of the first through twenty-fourth aspects, determining the final updated classifier parameter comprises averaging the plurality of updated classifier parameters.

In a twenty-sixth aspect, alone or in combination with one or more of the first through twenty-fifth aspects, process 1600 includes selecting a set of clients from which to obtain updates, wherein the set of clients includes the client, transmitting a set of neural network parameters to the set of clients, wherein the set of neural network parameters comprises a classifier parameter and a set of autoencoder parameters, receiving a plurality of sets of updated neural network parameters from the set of clients, and determining a final updated set of neural network parameters based at least in part on the plurality of sets of updated neural network parameters.

In a twenty-seventh aspect, alone or in combination with one or more of the first through twenty-sixth aspects, determining the final updated set of neural network parameters comprises averaging the plurality of updated neural network parameters.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
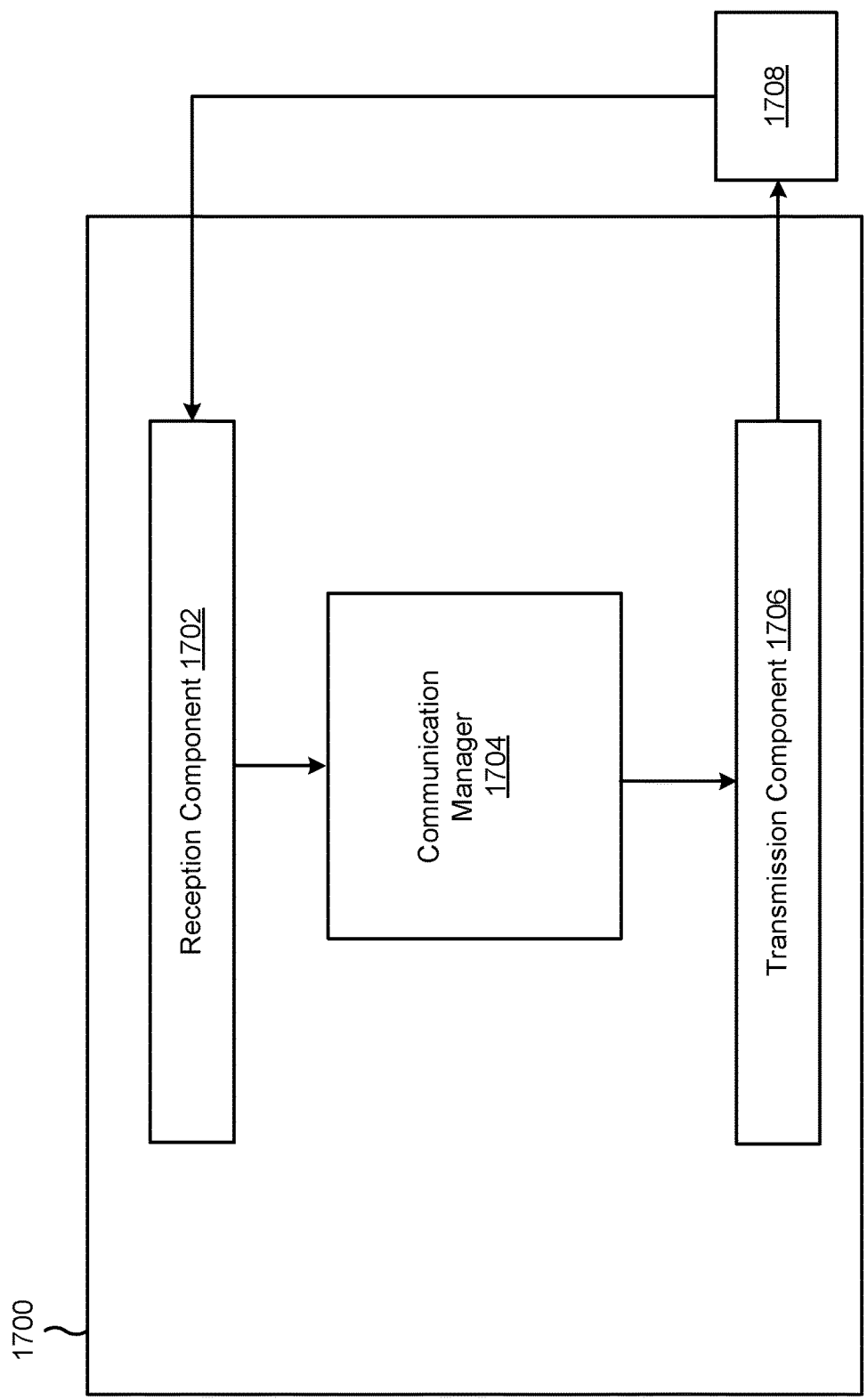
FIGS. 17 and 18 are examples of apparatuses for wireless communication, in accordance with the present disclosure.

FIG. 17 is a block diagram of an example apparatus 1700 for wireless communication in accordance with the present disclosure. The apparatus 1700 may be a client, or a client may include the apparatus 1700. In some aspects, the apparatus 1700 includes a reception component 1702, a communication manager 1704, and a transmission component 1706, which may be in communication with one another (for example, via one or more buses). As shown, the apparatus 1700 may communicate with another apparatus 1708 (such as a client, a UE, a server, a base station, or another wireless communication device) using the reception component 1702 and the transmission component 1706.

In some aspects, the apparatus 1700 may be configured to perform one or more operations described herein in connection with FIG. 3-16. Additionally or alternatively, the apparatus 1700 may be configured to perform one or more processes described herein, such as process 1500 of FIG. 15. In some aspects, the apparatus 1700 may include one or more components of the first UE described above in connection with FIG. 2.

The reception component 1702 may provide means for receiving communications, such as reference signals, control information, data communications, or a combination thereof, from the apparatus 1708. The reception component 1702 may provide received communications to one or more other components of the apparatus 1700, such as the communication manager 1704. In some aspects, the reception component 1702 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, a demodulator, a MIMO detector, a receive processor, a controller/processor, a memory, or a combination thereof, of the first UE described above in connection with FIG. 2.

The transmission component 1706 may provide means for transmitting communications, such as reference signals, control information, data communications, or a combination thereof, to the apparatus 1708. In some aspects, the communication manager 1704 may generate communications and may transmit the generated communications to the transmission component 1706 for transmission to the apparatus 1708. In some aspects, the transmission component 1706 may provide means for performing signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1706 may include one or more antennas, a modulator, a transmit MIMO processor, a transmit processor, a controller/processor, a memory, or a combination thereof, of the first UE described above in connection with FIG. 2. In some aspects, the transmission component 1706 may be co-located with the reception component 1702 in a transceiver.

In some aspects, the communication manager 1704 may provide means for selecting, based at least in part on a classifier, an autoencoder of a set of autoencoders to be used for encoding an observed wireless communication vector to generate a latent vector, means for transmitting the latent vector and an indication of the autoencoder, and/or the like. In some aspects, the communication manager 1704 may include a controller/processor, a memory, or a combination thereof, of the first UE described above in connection with FIG. 2.

In some aspects, the communication manager 1704 and/or one or more components of the communication manager 1704 may include or may be implemented within hardware (e.g., one or more of the circuitry described in connection with FIG. 21). In some aspects, the communication manager 1704 and/or one or more components of the set of components may include or may be implemented within a controller/processor, a memory, or a combination thereof, of the UE 120 described above in connection with FIG. 2.

In some aspects, the communication manager 1704 and/or one or more components of the communication manager 1704 may be implemented in code (e.g., as software or firmware stored in a memory), such as the code described in connection with FIG. 21. For example, the communication manager 1704 and/or a component thereof (or a portion of a component thereof) may be implemented as instructions or code stored in a non-transitory computer-readable medium and executable by a controller or a processor to perform the functions or operations of the communication manager 1704 and/or the component. If implemented in code, the functions of the communication manager 1704 and/or a component may be executed by a controller/processor, a memory, a scheduler, a communication unit, or a combination thereof, of the UE 120 described above in connection with FIG. 2.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
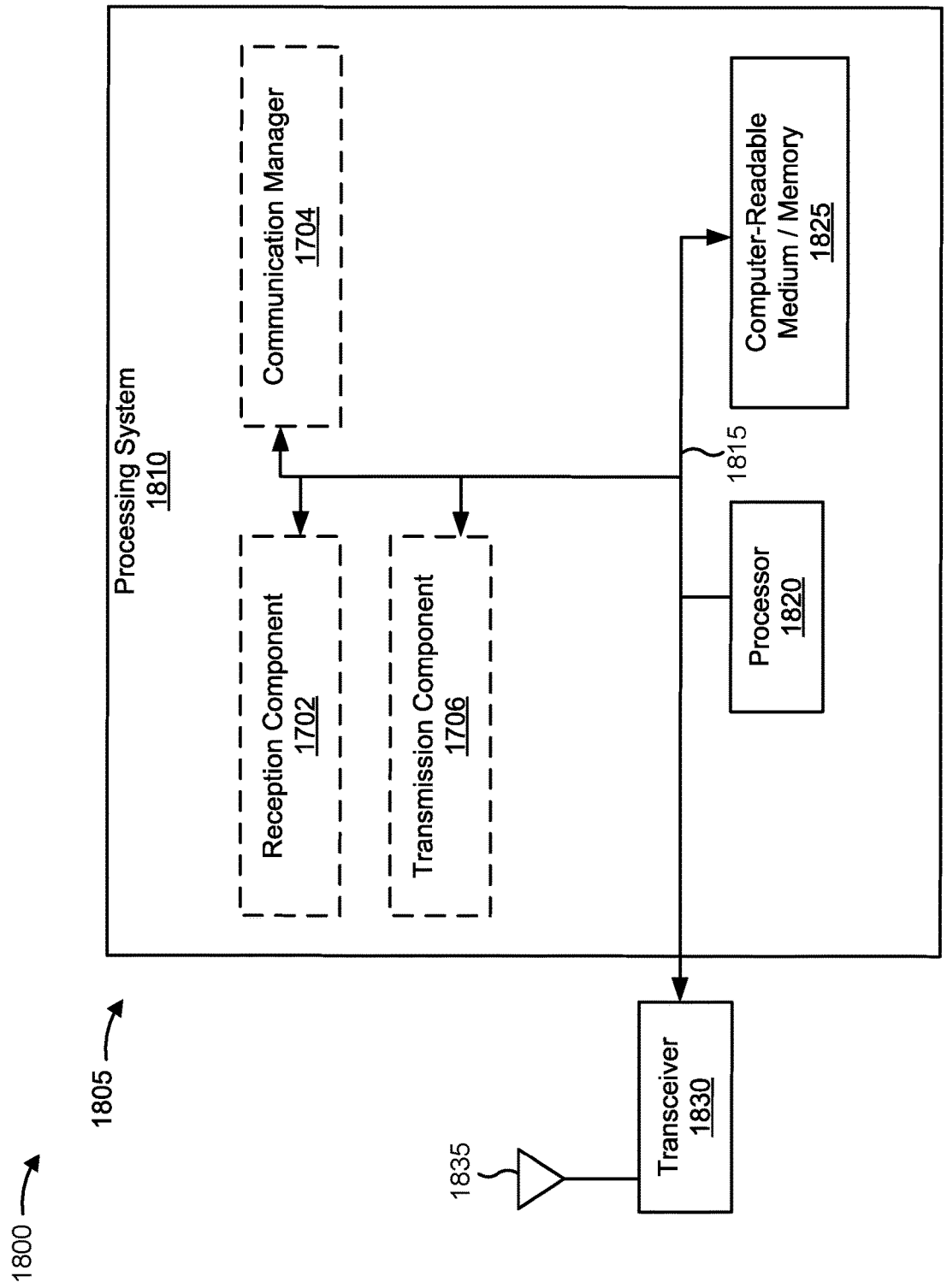

FIG. 18 is a diagram illustrating an example 1800 of a hardware implementation for an apparatus 1805 employing a processing system 1810. The apparatus 1805 may be a client.

The processing system 1810 may be implemented with a bus architecture, represented generally by the bus 1815. The bus 1815 may include any number of interconnecting buses and bridges depending on the specific application of the processing system 1810 and the overall design constraints. The bus 1815 links together various circuits including one or more processors and/or hardware components, represented by the processor 1820, the illustrated components, and the computer-readable medium/memory 1825. The bus 1815 may also link various other circuits, such as timing sources, peripherals, voltage regulators, power management circuits, and/or the like.

The processing system 1810 may be coupled to a transceiver 1830. The transceiver 1830 is coupled to one or more antennas 1835. The transceiver 1830 provides a means for communicating with various other apparatuses over a transmission medium. The transceiver 1830 receives a signal from the one or more antennas 1835, extracts information from the received signal, and provides the extracted information to the processing system 1810, specifically the reception component 1702. In addition, the transceiver 1830 receives information from the processing system 1810, specifically the transmission component 1706, and generates a signal to be applied to the one or more antennas 1835 based at least in part on the received information.

The processing system 1810 includes a processor 1820 coupled to a computer-readable medium/memory 1825. The processor 1820 is responsible for general processing, including the execution of software stored on the computer-readable medium/memory 1825. The software, when executed by the processor 1820, causes the processing system 1810 to perform the various functions described herein for any particular apparatus. The computer-readable medium/memory 1825 may also be used for storing data that is manipulated by the processor 1820 when executing software. The processing system further includes at least one of the illustrated components. The components may be software modules running in the processor 1820, resident/stored in the computer readable medium/memory 1825, one or more hardware modules coupled to the processor 1820, or some combination thereof.

In some aspects, the processing system 1810 may be a component of the UE 120 and may include the memory 282 and/or at least one of the TX MIMO processor 266, the RX processor 258, and/or the controller/processor 280. In some aspects, the apparatus 1805 for wireless communication provides means for selecting, based at least in part on a classifier, an autoencoder of a set of autoencoders to be used for encoding an observed wireless communication vector to generate a latent vector. In some aspects, the apparatus 1805 for wireless communication may provide means for transmitting the latent vector and an indication of the autoencoder. The aforementioned means may be one or more of the aforementioned components of the apparatus 1700 and/or the processing system 1810 of the apparatus 1805 configured to perform the functions recited by the aforementioned means. As described elsewhere herein, the processing system 1810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 18 is provided as an example. Other examples may differ from what is described in connection with FIG. 18.

Figure 19:
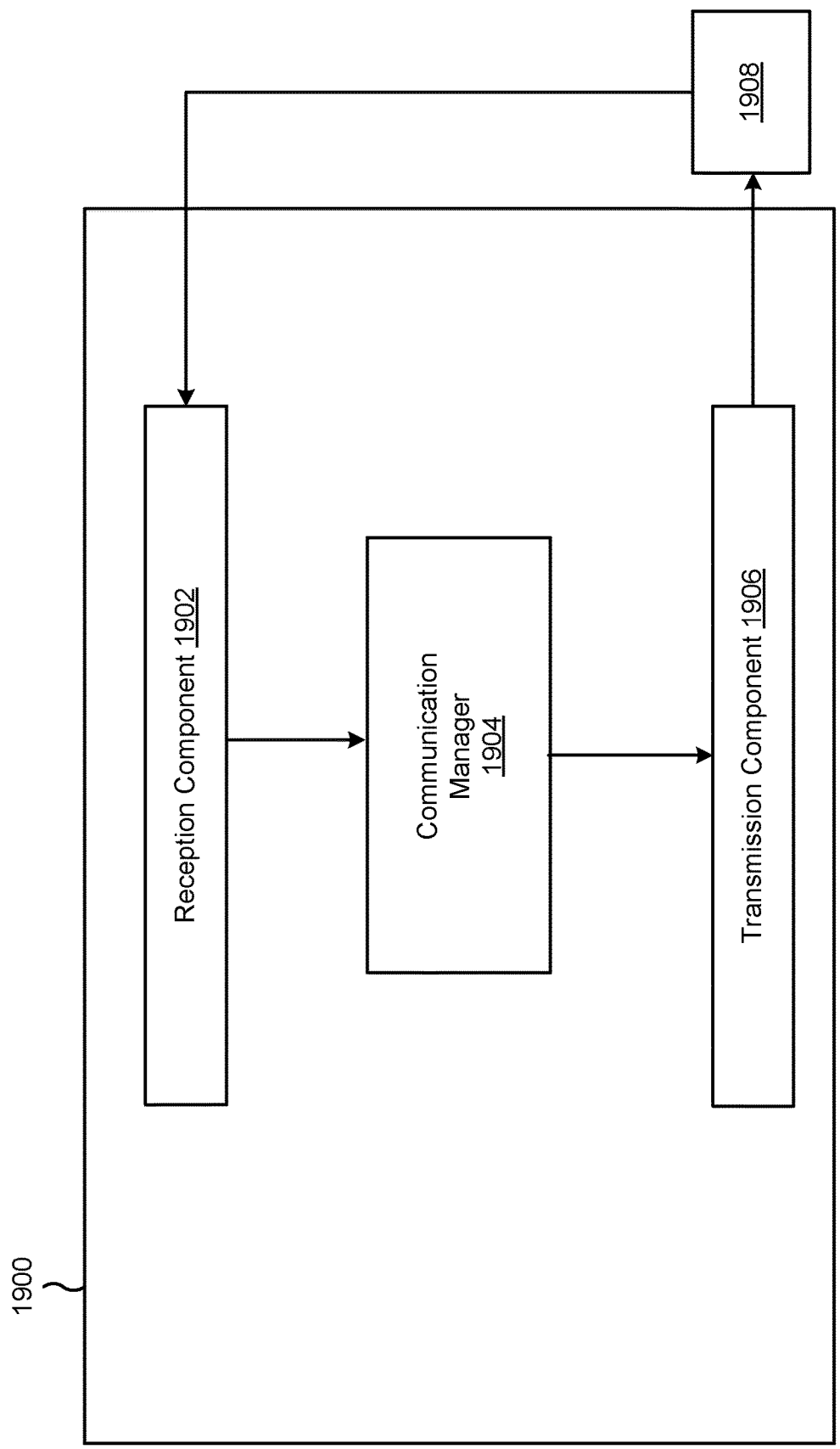
FIGS. 19 and 20 are diagrams illustrating examples of a hardware implementation for an apparatus employing a processing system, in accordance with the present disclosure.

FIG. 19 is a block diagram of an example apparatus 1900 for wireless communication in accordance with the present disclosure. The apparatus 1900 may be a server, or a server may include the apparatus 1900. In some aspects, the apparatus 1900 includes a reception component 1902, a communication manager 1904, and a transmission component 1906, which may be in communication with one another (for example, via one or more buses). As shown, the apparatus 1900 may communicate with another apparatus 1908 (such as a client, a UE, a server, a base station, or another wireless communication device) using the reception component 1902 and the transmission component 1906.

In some aspects, the apparatus 1900 may be configured to perform one or more operations described herein in connection with FIG. 3-16. Additionally or alternatively, the apparatus 1900 may be configured to perform one or more processes described herein, such as process 1600 of FIG. 16. In some aspects, the apparatus 1900 may include one or more components of the base station described above in connection with FIG. 2.

The reception component 1902 may provide means for receiving communications, such as reference signals, control information, data communications, or a combination thereof, from the apparatus 1908. The reception component 1902 may provide received communications to one or more other components of the apparatus 1900, such as the communication manager 1904. In some aspects, the reception component 1902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1902 may include one or more antennas, a demodulator, a MIMO detector, a receive processor, a controller/processor, a memory, or a combination thereof, of the base station described above in connection with FIG. 2.

The transmission component 1906 may provide means for transmitting communications, such as reference signals, control information, data communications, or a combination thereof, to the apparatus 1908. In some aspects, the communication manager 1904 may generate communications and may transmit the generated communications to the transmission component 1906 for transmission to the apparatus 1908. In some aspects, the transmission component 1906 may provide means for performing signal processing on the generated communications (such as filtering, amplification, modulation, digital-to-analog conversion, multiplexing, interleaving, mapping, or encoding, among other examples), and may transmit the processed signals to the apparatus 1908. In some aspects, the transmission component 1906 may include one or more antennas, a modulator, a transmit MIMO processor, a transmit processor, a controller/processor, a memory, or a combination thereof, of the base station described above in connection with FIG. 2. In some aspects, the transmission component 1906 may be co-located with the reception component 1902 in a transceiver.

The communication manager 1904 may provide means for receiving, from a client, an autoencoder identifier associated with an autoencoder of a set of autoencoders, means for receiving, from the client, a latent vector, means for selecting the autoencoder from the set of autoencoders based at least in part on the autoencoder identifier, means for determining an observed wireless communication vector based at least in part on the selected autoencoder and the latent vector, means for performing a wireless communication action based at least in part on determining the observed wireless communication vector, and/or the like. In some aspects, the communication manager 1904 may include a controller/processor, a memory, a scheduler, a communication unit, or a combination thereof, of the base station described above in connection with FIG. 2.

In some aspects, the communication manager 1904 and/or one or more components of the communication manager 1904 may include or may be implemented within hardware (e.g., one or more of the circuitry described in connection with FIG. 22). In some aspects, the communication manager 1904 and/or one or more components of the communication manager 1904 may include or may be implemented within a controller/processor, a memory, or a combination thereof, of the BS 110 described above in connection with FIG. 2.

In some aspects, the communication manager ZZ04 and/or one or more components of the set of components may be implemented in code (e.g., as software or firmware stored in a memory), such as the code described in connection with FIG. CC. For example, the communication manager ZZ04 and/or a component (or a portion of a component) may be implemented as instructions or code stored in a non-transitory computer-readable medium and executable by a controller or a processor to perform the functions or operations of the communication manager ZZ04 and/or the component. If implemented in code, the functions of the communication manager ZZ04 and/or a component may be executed by a controller/processor, a memory, a scheduler, a communication unit, or a combination thereof, of the BS 110 described above in connection with FIG. 2.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally or alternatively, a set of (one or more) components shown in FIG. 19 may perform one or more functions described as being performed by another set of components shown in FIG. 19.

Figure 20:
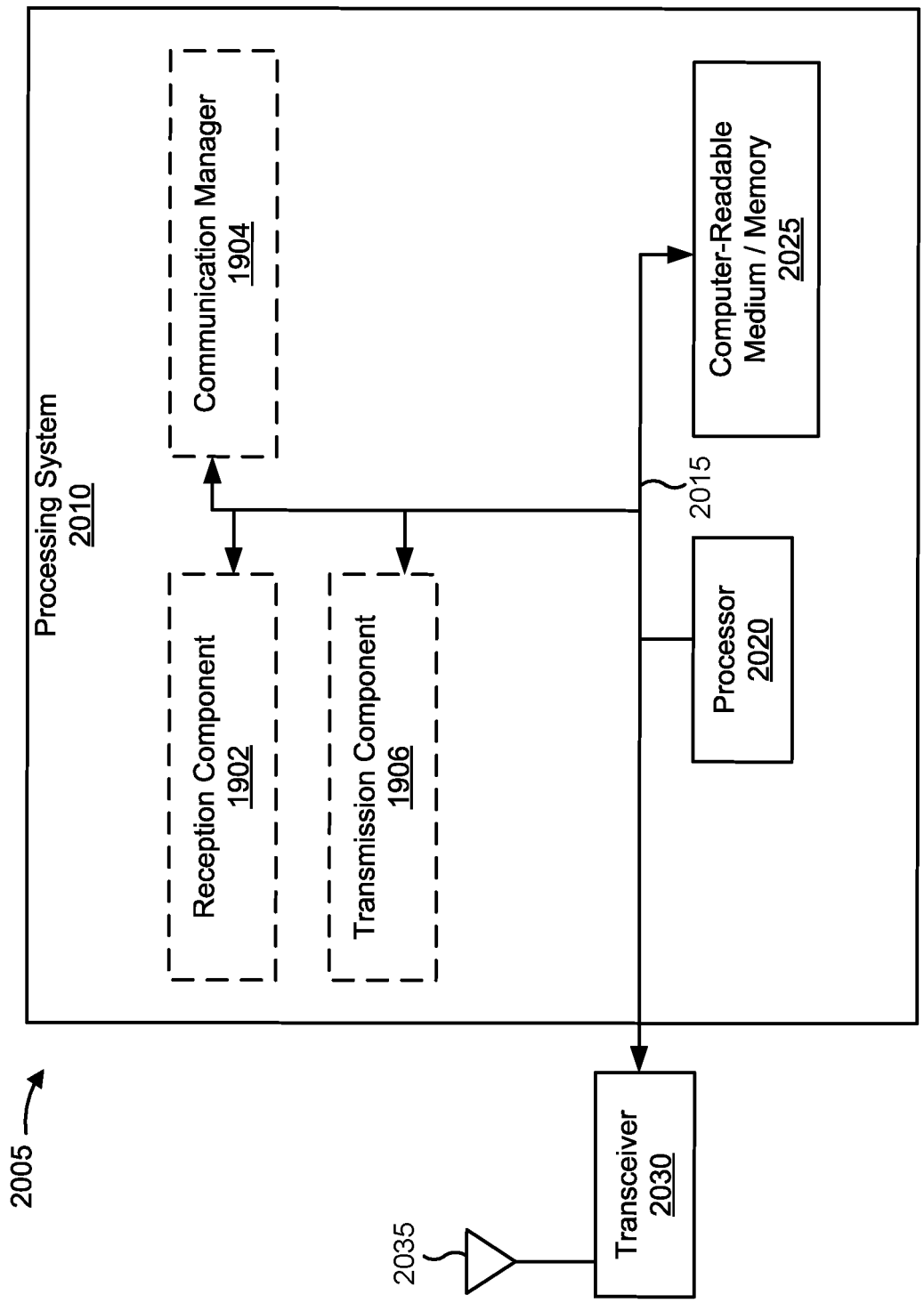

FIG. 20 is a diagram illustrating an example 2000 of a hardware implementation for an apparatus 2005 employing a processing system 2010. The apparatus 2005 may be a base station.

The processing system 2010 may be implemented with a bus architecture, represented generally by the bus 2015. The bus 2015 may include any number of interconnecting buses and bridges depending on the specific application of the processing system 2010 and the overall design constraints. The bus 2015 links together various circuits including one or more processors and/or hardware components, represented by the processor 2020, the illustrated components, and the computer-readable medium/memory 2025. The bus 2015 may also link various other circuits, such as timing sources, peripherals, voltage regulators, power management circuits, and/or the like.

The processing system 2010 may be coupled to a transceiver 2030. The transceiver 2030 is coupled to one or more antennas 2035. The transceiver 2030 provides a means for communicating with various other apparatuses over a transmission medium. The transceiver 2030 receives a signal from the one or more antennas 2035, extracts information from the received signal, and provides the extracted information to the processing system 2010, specifically the reception component 1902. In addition, the transceiver 2030 receives information from the processing system 2010, specifically the transmission component 1906, and generates a signal to be applied to the one or more antennas 2035 based at least in part on the received information.

The processing system 2010 includes a processor 2020 coupled to a computer-readable medium/memory 2025. The processor 2020 is responsible for general processing, including the execution of software stored on the computer-readable medium/memory 2025. The software, when executed by the processor 2020, causes the processing system 2010 to perform the various functions described herein for any particular apparatus. The computer-readable medium/memory 2025 may also be used for storing data that is manipulated by the processor 2020 when executing software. The processing system further includes at least one of the illustrated components. The components may be software modules running in the processor 2020, resident/stored in the computer readable medium/memory 2025, one or more hardware modules coupled to the processor 2020, or some combination thereof.

In some aspects, the processing system 2010 may be a component of the base station 110 and may include the memory 242 and/or at least one of the TX MIMO processor 230, the RX processor 238, and/or the controller/processor 240. In some aspects, the apparatus 2005 for wireless communication includes means for receiving, from a client, an autoencoder identifier associated with an autoencoder of a set of autoencoders, means for receiving, from the client, a latent vector, means for selecting the autoencoder from the set of autoencoders based at least in part on the autoencoder identifier, means for determining an observed wireless communication vector based at least in part on the selected autoencoder and the latent vector, means for performing a wireless communication action based at least in part on determining the observed wireless communication vector, and/or the like. The aforementioned means may be one or more of the aforementioned components of the apparatus 1900 and/or the processing system 2010 of the apparatus 2005 configured to perform the functions recited by the aforementioned means. As described elsewhere herein, the processing system 2010 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 20 is provided as an example. Other examples may differ from what is described in connection with FIG. 20.

Figure 21:
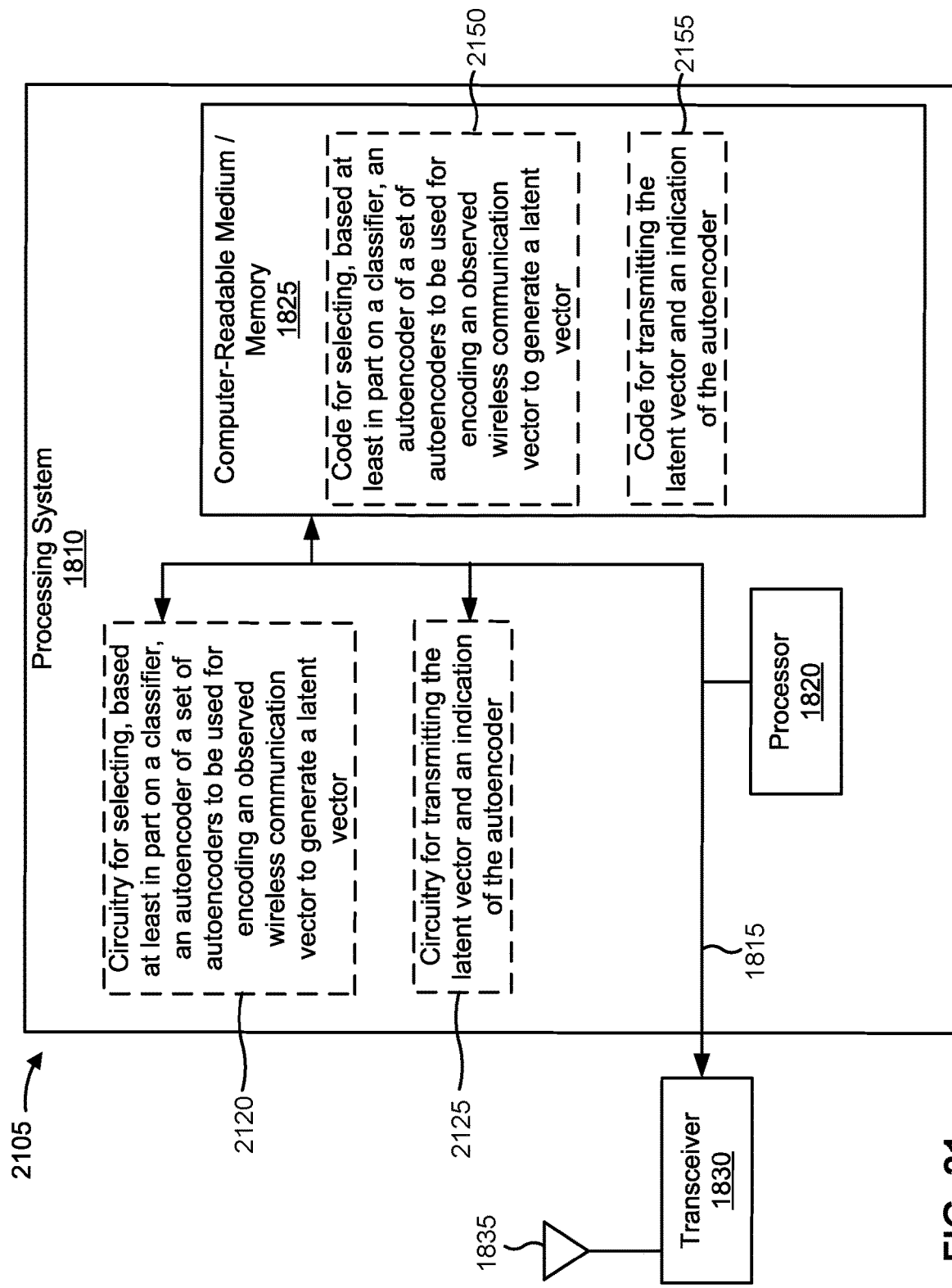
FIGS. 21 and 22 are diagrams illustrating examples of implementations of code and circuitry for an apparatus, in accordance with the present disclosure.

FIG. 21 is a diagram illustrating an example 2100 of an implementation of code and circuitry for an apparatus 2105. The apparatus 2105 may be a client.

As further shown in FIG. 21, the apparatus may include circuitry for selecting, based at least in part on a classifier, an autoencoder of a set of autoencoders to be used for encoding an observed wireless communication vector to generate a latent vector (circuitry 2120). For example, the apparatus may include circuitry to enable the apparatus to select, based at least in part on a classifier, an autoencoder of a set of autoencoders to be used for encoding an observed wireless communication vector to generate a latent vector.

As further shown in FIG. 21, the apparatus may include circuitry for transmitting the latent vector and an indication of the autoencoder (circuitry 2125). For example, the apparatus may include circuitry to transmit the latent vector and an indication of the autoencoder.

As further shown in FIG. 21, the apparatus may include, stored in computer-readable medium 1825, code for selecting, based at least in part on a classifier, an autoencoder of a set of autoencoders to be used for encoding an observed wireless communication vector to generate a latent vector (code 2150). For example, the apparatus may include code that, when executed by the processor 1820, may cause the processor 1820 to select, based at least in part on a classifier, an autoencoder of a set of autoencoders to be used for encoding an observed wireless communication vector to generate a latent vector.

As further shown in FIG. 21, the apparatus may include, stored in computer-readable medium 1825, code for transmitting the latent vector and an indication of the autoencoder (code 2155). For example, the apparatus may include code that, when executed by the processor 1820, may cause the transceiver 1830 to transmit the latent vector and an indication of the autoencoder.

FIG. 21 is provided as an example. Other examples may differ from what is described in connection with FIG. 21.

Figure 22:
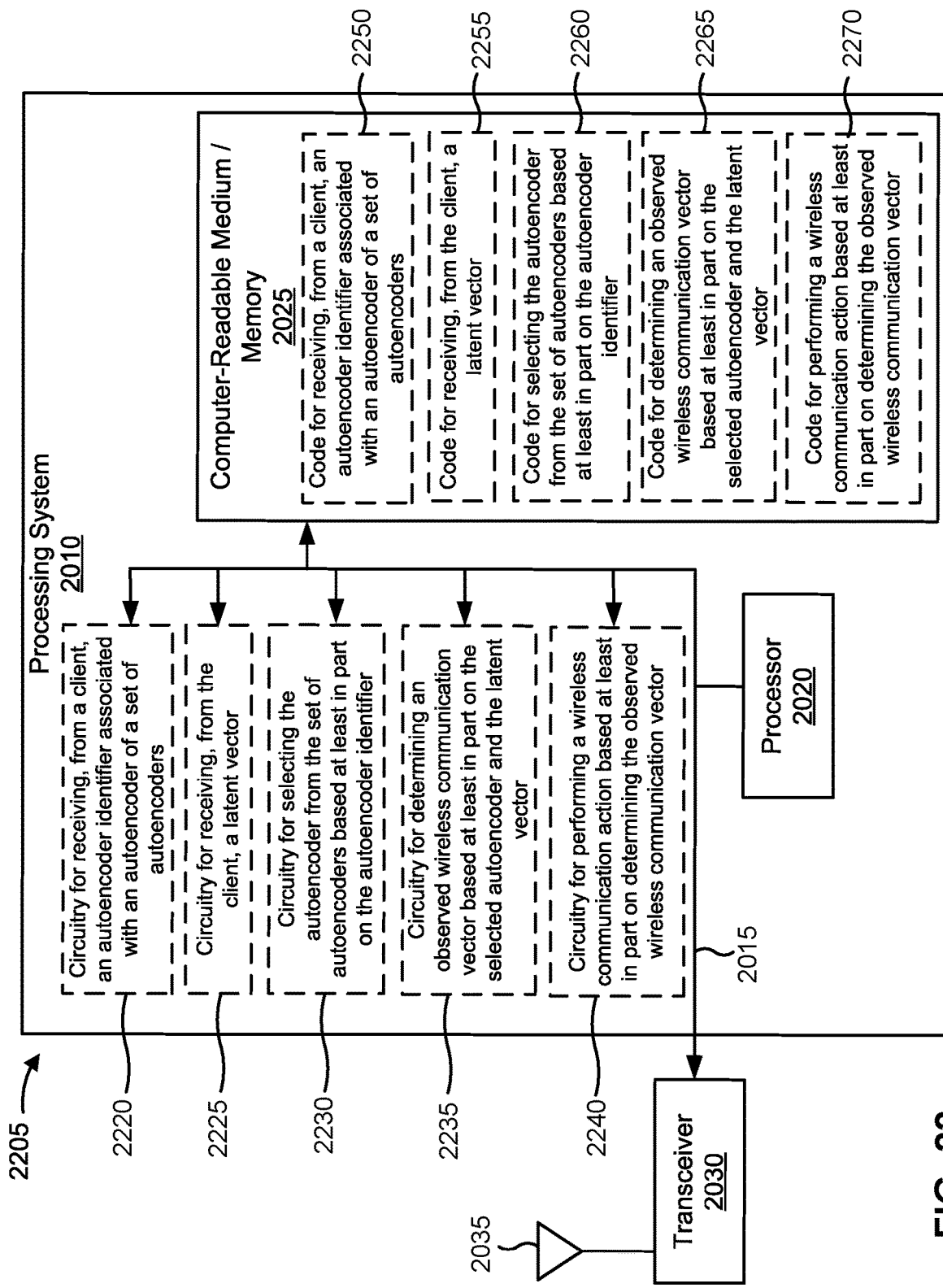

FIG. 22 is a diagram illustrating an example 2200 of an implementation of code and circuitry for an apparatus 2205. The apparatus 2205 may be a server.

As further shown in FIG. 22, the apparatus may include circuitry for receiving, from a client, an autoencoder identifier associated with an autoencoder of a set of autoencoders (circuitry 2220). For example, the apparatus may include circuitry to enable the apparatus to receive, from a client, an autoencoder identifier associated with an autoencoder of a set of autoencoders.

As further shown in FIG. 22, the apparatus may include circuitry for receiving, from the client, a latent vector (circuitry 2225). For example, the apparatus may include circuitry to enable the apparatus to receive, from the client, a latent vector.

As further shown in FIG. 22, the apparatus may include circuitry for selecting the autoencoder from the set of autoencoders based at least in part on the autoencoder identifier (circuitry 2230). For example, the apparatus may include circuitry to enable the apparatus to select the autoencoder from the set of autoencoders based at least in part on the autoencoder identifier.

As further shown in FIG. 22, the apparatus may include circuitry for determining an observed wireless communication vector based at least in part on the selected autoencoder and the latent vector (circuitry 2235). For example, the apparatus may include circuitry to enable the apparatus to determine an observed wireless communication vector based at least in part on the selected autoencoder and the latent vector.

As further shown in FIG. 22, the apparatus may include circuitry for performing a wireless communication action based at least in part on determining the observed wireless communication vector (circuitry 2240). For example, the apparatus may include circuitry to enable the apparatus to perform a wireless communication action based at least in part on determining the observed wireless communication vector.

As further shown in FIG. 22, the apparatus may include, stored in computer-readable medium 2025, code for receiving, from a client, an autoencoder identifier associated with an autoencoder of a set of autoencoders (code 2250). For example, the apparatus may include code that, when executed by the processor 2020, may cause the transceiver 2030 to receive, from a client, an autoencoder identifier associated with an autoencoder of a set of autoencoders.

As further shown in FIG. 22, the apparatus may include, stored in computer-readable medium 2025, code for receiving, from the client, a latent vector (code 2255). For example, the apparatus may include code that, when executed by the processor 2020, may cause the transceiver 2030 to receive, from the client, a latent vector.

As further shown in FIG. 22, the apparatus may include, stored in computer-readable medium 2025, code for selecting the autoencoder from the set of autoencoders based at least in part on the autoencoder identifier (code 2260). For example, the apparatus may include code that, when executed by the processor 2020, may cause the processor 2020 to select the autoencoder from the set of autoencoders based at least in part on the autoencoder identifier.

As further shown in FIG. 22, the apparatus may include, stored in computer-readable medium 2025, code for determining an observed wireless communication vector based at least in part on the selected autoencoder and the latent vector (code 2265). For example, the apparatus may include code that, when executed by the processor 2020, may cause the processor 2020 to determine an observed wireless communication vector based at least in part on the selected autoencoder and the latent vector.

As further shown in FIG. 22, the apparatus may include, stored in computer-readable medium 2025, code for performing a wireless communication action based at least in part on determining the observed wireless communication vector (code 2270). For example, the apparatus may include code that, when executed by the processor 2020, may cause the processor 2020 to perform a wireless communication action based at least in part on determining the observed wireless communication vector.

FIG. 22 is provided as an example. Other examples may differ from what is described in connection with FIG. 22.

The following provides an overview of some Aspects of the present disclosure:

Aspect 1: A method of wireless communication performed by a client, comprising: selecting, based at least in part on a classifier, an autoencoder of a set of autoencoders to be used for encoding an observed wireless communication vector to generate a latent vector; and transmitting the latent vector and an indication of the autoencoder.

Aspect 2: The method of Aspect 1, wherein selecting the autoencoder comprises: determining, using the classifier, a set of probabilities corresponding to the set of autoencoders; identifying a maximum probability of the set of probabilities; and determining that the maximum probability corresponds to the autoencoder, wherein selecting the autoencoder comprises selecting the autoencoder based at least in part on determining that the maximum probability corresponds to an autoencoder identifier associated with the autoencoder.

Aspect 3: The method of Aspect 2, wherein determining the set of probabilities comprises providing an observed environmental vector as input to the classifier.

Aspect 4: The method of Aspect 3, wherein the observed environmental vector comprises one or more feature components, wherein the one or more feature components indicate: a client vendor identifier, a client antenna configuration, a large scale channel characteristic, a channel state information reference signal configuration, an image obtained by an imaging device, a portion of an estimated propagation channel, or a combination thereof.

Aspect 5: The method of Aspect 4, wherein the large scale channel characteristic indicates at least one of: a delay spread associated with a channel, a power delay profile associated with a channel, a Doppler measurement associated with a channel, a Doppler spectrum associated with a channel, a signal to noise ratio associated with a channel a signal to noise plus interference ratio associated with a channel, a reference signal received power, a received signal strength indicator, or a combination thereof.

Aspect 6: The method of any of Aspects 1-5, wherein a last layer of the classifier comprises a softmax layer that outputs a probability vector indicating a set of probabilities corresponding to the set of autoencoders.

Aspect 7: The method of any of Aspects 1-6, wherein the autoencoder comprises: an encoder configured to receive the observed wireless communication vector as input and to provide the latent vector as output; and a decoder configured to receive the latent vector as input and to provide the observed wireless communication vector as output.

Aspect 8: The method of any of Aspects 1-7, wherein the set of autoencoders comprises a conditional autoencoder, and wherein the autoencoder comprises a state of the conditional autoencoder.

Aspect 9: The method of Aspect 8, wherein the conditional autoencoder comprises: an encoder configured to receive the indication of the autoencoder and the observed wireless communication vector as input and to provide the latent vector as output; and a decoder configured to receive the indication of the autoencoder and the latent vector as input and to provide the observed wireless communication vector as output.

Aspect 10: The method of any of Aspects 1-9, wherein the latent vector is associated with a wireless communication task.

Aspect 11: The method of Aspect 10, wherein the wireless communication task comprises at least one of: determining channel state feedback (CSF), determining positioning information associated with the client, determining a modulation associated with a wireless communication, determining a waveform associated with a wireless communication, or a combination thereof.

Aspect 12: The method of Aspect 11, wherein the wireless communication task comprises determining the CSF, and wherein the method further comprises: receiving a channel state information (CSI) reference signal (CSI-RS); determining CSI based at least in part on the CSI-RS; and providing the CSI as input to the autoencoder.

Aspect 13: The method of Aspect 12, wherein the latent vector comprises compressed channel state feedback.

Aspect 14: The method of any of Aspects 1-13, wherein transmitting the latent vector and the indication of the autoencoder comprises transmitting the latent vector and the indication of the autoencoder using at least one of: a physical uplink control channel, a physical uplink shared channel, or a combination thereof.

Aspect 15: The method of any of Aspects 1-14, wherein the set of autoencoders comprises: a regular autoencoder, a variational autoencoder, or a combination thereof.

Aspect 16: The method of any of Aspects 1-15, further comprising training the classifier, the set of autoencoders, or a combination thereof.

Aspect 17: The method of Aspect 16, wherein training the classifier, the set of autoencoders, or a combination thereof comprises using an unsupervised learning procedure.

Aspect 18: The method of any of Aspects 1-5, further comprising training the set of autoencoders using an observed wireless communication training vector.

Aspect 19: The method of Aspect 18, wherein training the set of autoencoders comprises determining a set of neural network parameters that maximize a variational lower bound function corresponding to the set of autoencoders.

Aspect 20: The method of Aspect 19, wherein the variational lower bound function is based at least in part on a set of conditional probabilities of selecting one or more autoencoders of the set of autoencoders, and a reconstruction loss of one or more autoencoders of the set of autoencoders.

Aspect 21: The method of Aspect 20, wherein the set of autoencoders comprises a conditional autoencoder, and wherein the variational lower bound function is based at least in part on a set of conditional probabilities associated with one or more states of the conditional autoencoder, and a reconstruction loss of the conditional autoencoder corresponding to one or more states.

Aspect 22: The method of either of Aspects 20 or 21, wherein the variational lower bound function includes a regularization term for at least one autoencoder of the set of autoencoders.

Aspect 23: The method of any of Aspects 20-22, wherein the at least one autoencoder is a regular autoencoder, and wherein the variational lower bound function does not include a regularization term.

Aspect 24: The method of any of Aspects 1-23, further comprising training the classifier and the set of autoencoders using a federated learning procedure.

Aspect 25: The method of Aspect 24, wherein the federated learning procedure comprises a fully federated learning procedure.

Aspect 26: The method of Aspect 25, wherein training the classifier and the set of autoencoders using the fully federated learning procedure comprises jointly training the classifier and the set of autoencoders.

Aspect 27: The method of Aspect 26, wherein jointly training the set of autoencoders and the classifier comprises mapping an observed environmental training vector to an autoencoder selection label.

Aspect 28: The method of any of Aspects 25-27, wherein training the classifier and the set of autoencoders using the fully federated learning procedure comprises alternating between training the classifier and training the set of autoencoders.

Aspect 29: The method of Aspect 28, wherein alternating between training the classifier and training the set of autoencoders comprises: performing a first plurality of training iterations associated with the classifier according to a first training frequency; and performing a second plurality of training iterations associated with the set of autoencoders according to a second training frequency that is higher than the first training frequency.

Aspect 30: The method of Aspect 24, wherein training the classifier and the set of autoencoders using the federated learning procedure comprises performing a partial federated learning procedure.

Aspect 31: The method of Aspect 30, wherein performing the partial federated learning procedure comprises: providing an observed environmental training vector to a server; and receiving the classifier from the server, wherein the classifier is based at least in part on the observed environmental training vector.

Aspect 32: The method of Aspect 31, wherein the classifier is based at least in part on at least one additional environmental vector associated with at least one additional client.

Aspect 33: The method of any of Aspects 30-32, wherein performing the partial federated learning procedure comprises: updating the set of autoencoders to determine a set of updated autoencoder parameters; and transmitting the set of updated autoencoder parameters to a server.

Aspect 34: The method of any of Aspects 30-33, wherein performing the partial federated learning procedure comprises: performing a first plurality of training iterations associated with the classifier according to a first training frequency, wherein performing a training iteration of the first plurality of training iterations comprises: providing an observed environmental training vector to a server; and receiving an updated classifier from the server, wherein the updated classifier is based at least in part on the observed environmental training vector; and performing a second plurality of training iterations associated with the set of autoencoders according to a second training frequency that is higher than the first training frequency.

Aspect 35: The method of any of Aspects 30-34, further comprising: determining a plurality of gradients of the set of losses with respect to a set of autoencoder parameters; and updating the set of autoencoder parameters based at least in part on the plurality of gradients.

Aspect 36: The method of Aspect 35, further comprising updating the set of autoencoder parameters a specified number of times to determine a final set of updated autoencoder parameters.

Aspect 37: The method of Aspect 36, further comprising transmitting the final set of updated autoencoder parameters to the server.

Aspect 38: The method of any of Aspects 1-37, further comprising: receiving, from a server, a set of neural network parameters corresponding to the classifier and the set of autoencoders, wherein the set of neural network parameters includes a classifier parameter and a set of autoencoder parameters; obtaining an observed environmental training vector; and inputting the observed environmental training vector to the classifier to determine a training probability vector.

Aspect 39: The method of Aspect 38, further comprising: obtaining an observed wireless communication training vector; inputting the observed wireless communication training vector to a set of encoders of the set of autoencoders to determine a set of training latent vectors; inputting the set of training latent vectors to a set of decoders of the set of autoencoders to determine a set of training outputs of the set of autoencoders; and determining a set of losses associated with the set of autoencoders based at least in part on a set of training outputs, wherein the set of losses are associated with the set of neural network parameters.

Aspect 40: The method of Aspect 39, further comprising: determining a set of regularization terms corresponding to the set of autoencoders, wherein determining the set of losses comprises determining the set of losses based at least in part on the set of regularization terms.

Aspect 41: The method of either of Aspects 39 or 40, further comprising determining a total loss based at least in part on the set of losses and the training probability vector.

Aspect 42: The method of Aspect 41, further comprising: determining a plurality of gradients of the total loss with respect to the set of neural network parameters; and updating the set of neural network parameters based at least in part on the plurality of gradients.

Aspect 43: The method of Aspect 42, further comprising updating the set of neural network parameters a specified number of times to determine a final set of updated neural network parameters.

Aspect 44: The method of Aspect 43, further comprising transmitting the final set of updated neural network parameters to the server.

Aspect 45: The method of any of Aspects 41-44, further comprising: determining a first plurality of gradients of the total loss with respect to the classifier parameter; and updating the classifier parameter based at least in part on the first plurality of gradients.

Aspect 46: The method of Aspect 45, further comprising updating the classifier parameter a specified number of times to determine a final updated classifier parameter.

Aspect 47: The method of Aspect 46, further comprising transmitting the final updated classifier parameter to the server.

Aspect 48: The method of Aspect 47, further comprising: determining a second plurality of gradients of the total loss with respect to the set of autoencoder parameters; and updating the set of autoencoder parameters based at least in part on the second plurality of gradients.

Aspect 49: The method of Aspect 48, further comprising updating the set of autoencoder parameters a specified number of times to determine a final set of updated autoencoder parameters.

Aspect 50: The method of Aspect 49, further comprising transmitting the final set of updated autoencoder parameters to the server.

Aspect 51: A method of wireless communication performed by a server, comprising: receiving, from a client, an autoencoder identifier associated with an autoencoder of a set of autoencoders; receiving, from the client, a latent vector; selecting the autoencoder from the set of autoencoders based at least in part on the autoencoder identifier; determining an observed wireless communication vector based at least in part on the selected autoencoder and the latent vector; and performing a wireless communication action based at least in part on determining the observed wireless communication vector.

Aspect 52: The method of Aspect 51, wherein the autoencoder identifier corresponds to a maximum probability of a set of probabilities corresponding to the set of autoencoders.

Aspect 53: The method of Aspect 52, wherein the set of probabilities are based at least in part on a classifier.

Aspect 54: The method of Aspect 53, wherein the classifier is configured to receive an observed environmental vector as input and to provide the set of probabilities as output.

Aspect 55: The method of Aspect 54, wherein the observed environmental vector comprises one or more feature components, wherein the one or more feature components indicate: a client vendor identifier, a client antenna configuration, a large scale channel characteristic, a channel state information reference signal configuration, an image obtained by an imaging device, a portion of an estimated propagation channel, or a combination thereof.

Aspect 56: The method of Aspect 55, wherein the large scale channel characteristic indicates at least one of: a delay spread associated with a channel, a power delay profile associated with a channel, a Doppler measurement associated with a channel, a Doppler spectrum associated with a channel, a signal to noise ratio associated with a channel a signal to noise plus interference ratio associated with a channel, a reference signal received power, a received signal strength indicator, or a combination thereof.

Aspect 57: The method of any of Aspects 52-56, wherein a last layer of the classifier comprises a softmax layer that outputs a probability vector indicating the set of probabilities corresponding to the set of autoencoders.

Aspect 58: The method of any of Aspects 51-57, wherein the autoencoder comprises: an encoder configured to receive the observed wireless communication vector as input and to provide the latent vector as output; and a decoder configured to receive the latent vector as input and to provide the observed wireless communication vector as output.

Aspect 59: The method of any of Aspects 51-58, wherein the set of autoencoders comprises a conditional autoencoder, and wherein the selected autoencoder comprises a state of the conditional autoencoder.

Aspect 60: The method of Aspect 59, wherein the conditional autoencoder comprises: an encoder configured to receive the indication of the autoencoder and the observed wireless communication vector as input and to provide the latent vector as output; and a decoder configured to receive the indication of the autoencoder and the latent vector as input and to provide the observed wireless communication vector as output.

Aspect 61: The method of any of Aspects 51-60, wherein the latent vector is associated with a wireless communication task corresponding to the client.

Aspect 62: The method of Aspect 61, wherein the wireless communication task comprises at least one of: determining channel state feedback (CSF), determining positioning information associated with the client, determining a modulation associated with a wireless communication, determining a waveform associated with a wireless communication, or a combination thereof.

Aspect 63: The method of Aspect 62, wherein the wireless communication task comprises determining the CSF, and wherein the method further comprises: transmitting a channel state information (CSI) reference signal (CSI-RS), wherein the observed wireless communication vector comprises CSI based at least in part on the CSI-RS.

Aspect 64: The method of Aspect 63, wherein the latent vector comprises compressed channel state feedback.

Aspect 65: The method of any of Aspects 51-64, wherein the latent vector and the autoencoder identifier are carried using at least one of: a physical uplink control channel, a physical uplink shared channel, or a combination thereof.

Aspect 66: The method of any of Aspects 51-65, wherein the set of autoencoders comprises: a regular autoencoder, a variational autoencoder, or a combination thereof.

Aspect 67: The method of any of Aspects 51-66, further comprising training the classifier.

Aspect 68: The method of Aspect 67, wherein training the classifier comprises using an unsupervised learning procedure.

Aspect 69: The method of either of Aspects 67 or 68, wherein training the classifier comprises performing a partial federated learning procedure.

Aspect 70: The method of Aspect 69, wherein performing the partial federated learning procedure comprises: receiving an observed environmental training vector from the client; and transmitting the classifier to the client, wherein the classifier is based at least in part on the observed environmental training vector.

Aspect 71: The method of Aspect 70, wherein the classifier is based at least in part on at least one additional environmental vector associated with at least one additional client.

Aspect 72: The method of any of Aspects 69-71, wherein performing the partial federated learning procedure comprises receiving a plurality of sets of updated neural network parameters from the client and at least one additional client.

Aspect 73: The method of any of Aspects 51-72, further comprising: selecting a set of clients from which to obtain updates, wherein the set of clients includes the client; transmitting a set of neural network parameters to the set of clients, wherein the set of neural network parameters comprises a classifier parameter and a set of autoencoder parameters; receiving a plurality of sets of updated neural network parameters from the set of clients; and determining a final set of updated neural network parameters based at least in part on the plurality of sets of updated neural network parameters.

Aspect 74: The method of Aspect 73, wherein determining the final set of updated neural network parameters comprises averaging the plurality of sets of updated neural network parameters.

Aspect 75: The method of any of Aspects 51-74, further comprising: selecting a set of clients from which to obtain updates, wherein the set of clients includes the client; transmitting a set of neural network parameters to the set of clients, wherein the set of neural network parameters comprises a classifier parameter and a set of autoencoder parameters; receiving a plurality of updated classifier parameters from the set of clients; and determining a final updated classifier parameter based at least in part on the plurality of updated classifier parameters.

Aspect 76: The method of Aspect 75, wherein determining the final updated classifier parameter comprises averaging the plurality of updated classifier parameters.

Aspect 77: The method of any of Aspects 51-76, further comprising: selecting a set of clients from which to obtain updates, wherein the set of clients includes the client; transmitting a set of neural network parameters to the set of clients, wherein the set of neural network parameters comprises a classifier parameter and a set of autoencoder parameters; receiving a plurality of sets of updated neural network parameters from the set of clients; and determining a final updated set of neural network parameters based at least in part on the plurality of sets of updated neural network parameters.

Aspect 78: The method of Aspect 77, wherein determining the final updated set of neural network parameters comprises averaging the plurality of updated neural network parameters.

Aspect 79: An apparatus for wireless communication at a device, comprising a processor; memory coupled with the processor; and instructions stored in the memory and executable by the processor to cause the apparatus to perform the method of one or more of Aspects 1-50.

Aspect 80: A device for wireless communication, comprising a memory and one or more processors coupled to the memory, the one or more processors configured to perform the method of one or more of Aspects 1-50.

Aspect 81: An apparatus for wireless communication, comprising at least one means for performing the method of one or more of Aspects 1-50.

Aspect 82: A non-transitory computer-readable medium storing code for wireless communication, the code comprising instructions executable by a processor to perform the method of one or more of Aspects 1-50.

Aspect 83: A non-transitory computer-readable medium storing a set of instructions for wireless communication, the set of instructions comprising one or more instructions that, when executed by one or more processors of a device, cause the device to perform the method of one or more of Aspects 1-50.

Aspect 84: An apparatus for wireless communication at a device, comprising a processor; memory coupled with the processor; and instructions stored in the memory and executable by the processor to cause the apparatus to perform the method of one or more of Aspects 51-78.

Aspect 85: A device for wireless communication, comprising a memory and one or more processors coupled to the memory, the one or more processors configured to perform the method of one or more of Aspects 51-78.

Aspect 86: An apparatus for wireless communication, comprising at least one means for performing the method of one or more of Aspects 51-78.

Aspect 87: A non-transitory computer-readable medium storing code for wireless communication, the code comprising instructions executable by a processor to perform the method of one or more of Aspects 51-78.

Aspect 88: A non-transitory computer-readable medium storing a set of instructions for wireless communication, the set of instructions comprising one or more instructions that, when executed by one or more processors of a device, cause the device to perform the method of one or more of Aspects 51-78.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a client, comprising:
    selecting, based at least in part on a classifier, an autoencoder of a set of autoencoders to be used for encoding an observed wireless communication vector to generate a latent vector; and
    transmitting the latent vector and an indication of the autoencoder.

2. A method of wireless communication performed by a server, comprising:
    receiving, from a client, an autoencoder identifier associated with an autoencoder of a set of autoencoders;
    receiving, from the client, a latent vector;
    selecting the autoencoder from the set of autoencoders based at least in part on the autoencoder identifier;
    determining an observed wireless communication vector based at least in part on the selected autoencoder and the latent vector; and
    performing a wireless communication action based at least in part on determining the observed wireless communication vector.

3. An apparatus for wireless communication at a client, comprising:
    one or more memories; and
    one or more processors, coupled to the one or more memories, the one or more processors configured to cause the client to:
        select, based at least in part on a classifier, an autoencoder of a set of autoencoders to be used for encoding an observed wireless communication vector to generate a latent vector; and
        transmit the latent vector and an indication of the autoencoder.

4. The apparatus of claim 3, wherein the one or more processors, to cause the client to select the autoencoder, are configured to cause the client to:
    determine, using the classifier, a set of probabilities corresponding to the set of autoencoders;
    identify a maximum probability of the set of probabilities; and
    determine that the maximum probability corresponds to the autoencoder,
        wherein the one or more processors, to cause the client to select the autoencoder, are configured to cause the client to select the autoencoder based at least in part on determining that the maximum probability corresponds to an autoencoder identifier associated with the autoencoder.

5. The apparatus of claim 4, wherein the one or more processors, to cause the client to determine the set of probabilities, are configured to cause the client to provide an observed environmental vector as input to the classifier, wherein the observed environmental vector comprises one or more feature components, and wherein the one or more feature components indicate:
a client vendor identifier,
a client antenna configuration,
a large scale channel characteristic,
a channel state information reference signal configuration,
an image obtained by an imaging device,
a portion of an estimated propagation channel, or
a combination thereof.

6. The apparatus of claim 5, wherein the large scale channel characteristic indicates at least one of:
a delay spread associated with a channel,
a power delay profile associated with the channel,
a Doppler measurement associated with the channel,
a Doppler spectrum associated with the channel,
a signal to noise ratio associated with the channel,
a signal to noise plus interference ratio associated with the channel,
a reference signal received power,
a received signal strength indicator, or
a combination thereof.

7. The apparatus of claim 3, wherein a last layer of the classifier comprises a softmax layer that outputs a probability vector indicating a set of probabilities corresponding to the set of autoencoders.

8. The apparatus of claim 3, wherein the autoencoder comprises:
an encoder configured to receive the observed wireless communication vector as input to the encoder and to provide the latent vector as output of the encoder; and
a decoder configured to receive the latent vector as input to the decoder and to provide the observed wireless communication vector as output of the decoder.

9. The apparatus of claim 3, wherein the set of autoencoders comprises a conditional autoencoder, and wherein the autoencoder comprises a state of the conditional autoencoder.

10. The apparatus of claim 9, wherein the conditional autoencoder comprises:
an encoder configured to receive the indication of the autoencoder and the observed wireless communication vector as input to the encoder and to provide the latent vector as output of the encoder; and
a decoder configured to receive the indication of the autoencoder and the latent vector as input to the decoder and to provide the observed wireless communication vector as output of the decoder.

11. The apparatus of claim 3, wherein the latent vector is associated with a wireless communication task, and wherein the wireless communication task comprises at least one of:
determine channel state feedback (CSF),
determine positioning information associated with the client,
determine a modulation associated with a wireless communication,
determine a waveform associated with the wireless communication, or
a combination thereof.

12. The apparatus of claim 11, wherein the wireless communication task is to determine the CSF, and wherein the one or more processors are configured to cause the client to:
receive a channel state information (CSI) reference signal (CSI-RS);
determine CSI based at least in part on the CSI-RS; and
provide the CSI as input to the autoencoder.

13. The apparatus of claim 3, wherein the one or more processors, to cause the client to transmit the latent vector and the indication of the autoencoder, are configured to cause the client to transmit the latent vector and the indication of the autoencoder using at least one of:
a physical uplink control channel,
a physical uplink shared channel, or
a combination thereof.

14. The apparatus of claim 3, wherein the set of autoencoders comprises:
a regular autoencoder,
a variational autoencoder, or
a combination thereof.

15. The apparatus of claim 3, wherein the one or more processors are further configured to cause the client to train the classifier, the set of autoencoders, or a combination thereof.

16. The apparatus of claim 3, wherein the one or more processors are further configured to cause the client to train the set of autoencoders using an observed wireless communication training vector.

17. The apparatus of claim 16, wherein the one or more processors, to cause the client to train the set of autoencoders, are configured to cause the client to determine a set of neural network parameters that maximize a variational lower bound function corresponding to the set of autoencoders.

18. The apparatus of claim 17, wherein the variational lower bound function is based at least in part on a set of conditional probabilities of selecting one or more autoencoders of the set of autoencoders, and a reconstruction loss of the one or more autoencoders of the set of autoencoders.

19. The apparatus of claim 18, wherein the set of autoencoders comprises a conditional autoencoder, and
wherein the variational lower bound function is based at least in part on a set of conditional probabilities associated with one or more states of the conditional autoencoder, and the reconstruction loss of the conditional autoencoder corresponding to one or more states.

20. The apparatus of claim 18, wherein the variational lower bound function includes a regularization term for at least one autoencoder of the set of autoencoders.

21. The apparatus of claim 20, wherein the at least one autoencoder is a regular autoencoder, and wherein the variational lower bound function does not include a regularization term.

22. The apparatus of claim 3, wherein the one or more processors are further configured to cause the client to train the classifier and the set of autoencoders using a federated learning procedure, wherein the federated learning procedure comprises a fully federated learning procedure.

23. The apparatus of claim 22, wherein the one or more processors, to cause the client to train the classifier and the set of autoencoders using the fully federated learning procedure, are configured to cause the client to jointly train the classifier and the set of autoencoders.

24. The apparatus of claim 23, wherein the one or more processors, to cause the client to jointly train the set of autoencoders and the classifier, are configured to cause the client to map an observed environmental training vector to an autoencoder selection label.

25. The apparatus of claim 22, wherein the one or more processors, to cause the client to train the classifier and the set of autoencoders using the fully federated learning procedure, are configured to cause the client to alternate between training the classifier and training the set of autoencoders.

26. The apparatus of claim 25, wherein the one or more processors, to cause the client to alternate between training the classifier and training the set of autoencoders, are configured to cause the client to:
perform a first plurality of training iterations associated with the classifier according to a first training frequency; and
perform a second plurality of training iterations associated with the set of autoencoders according to a second training frequency that is higher than the first training frequency.

27. The apparatus of claim 3, wherein the one or more processors are further configured to cause the client to train the classifier and the set of autoencoders using a federated learning procedure, wherein the federated learning procedure comprises a partial federated learning procedure.

28. The apparatus of claim 27, wherein the one or more processors, to cause the client to perform the partial federated learning procedure, are configured to cause the client to:
provide an observed environmental training vector to a server; and
receive the classifier from the server, wherein the classifier is based at least in part on the observed environmental training vector.

29. The apparatus of claim 28, wherein the classifier is based at least in part on at least one additional environmental vector associated with at least one additional client.

30. An apparatus for wireless communication at a server, comprising:
one or more memories; and
one or more processors, coupled to the one or more memories, the one or more processors configured to cause the server to:
receive, from a client, an autoencoder identifier associated with an autoencoder of a set of autoencoders;
receive, from the client, a latent vector;
select the autoencoder from the set of autoencoders based at least in part on the autoencoder identifier;
determine an observed wireless communication vector based at least in part on the selected autoencoder and the latent vector; and
perform a wireless communication action based at least in part on determining the observed wireless communication vector.

* * * * *